United States Patent
Huang

(10) Patent No.: US 8,780,464 B2
(45) Date of Patent: Jul. 15, 2014

(54) OPTICAL IMAGE CAPTURING LENSES

(75) Inventor: Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 205 days.

(21) Appl. No.: 13/404,001

(22) Filed: Feb. 24, 2012

(65) Prior Publication Data

US 2013/0050846 A1    Feb. 28, 2013

(30) Foreign Application Priority Data

Aug. 24, 2011   (TW) .............................. 100130316 A

(51) Int. Cl.
*G02B 9/62* (2006.01)
*G02B 13/04* (2006.01)
*G02B 13/18* (2006.01)
*G02B 3/02* (2006.01)

(52) U.S. Cl.
CPC ........................................ *G02B 9/62* (2013.01)
USPC ............ 359/762; 359/752; 359/713; 359/751

(58) Field of Classification Search
CPC .................................... G02B 9/34; G02B 9/62
USPC .......... 359/752, 756, 762, 713, 714, 755, 751
See application file for complete search history.

(56) References Cited

U.S. PATENT DOCUMENTS

| 7,145,736 | B2 | 12/2006 | Noda |
| 7,199,947 | B2 * | 4/2007 | Wang et al. .................. 359/755 |
| 7,365,920 | B2 | 4/2008 | Noda |

* cited by examiner

*Primary Examiner* — Alicia M Harrington
(74) *Attorney, Agent, or Firm* — CKC & Partners Co., Ltd.

(57) ABSTRACT

An optical image capturing lenses includes, in order from an object side to an image side, a front lens group, a stop, and a rear lens group. The front lens group includes, in order from the object side to the image side, at least a first lens element and a second lens element. The first lens element has a convex object-side surface and a concave image-side surface. The rear lens group includes, in order from the object side to the image side, at least a third lens element, a fourth lens element, a fifth lens element, and a sixth lens element. The sixth lens element is made of plastic material. The object-side surface and the image-side surface of the sixth lens are aspheric. The sixth lens element has at least one inflection point formed on at least one of the object-side surface and the image-side surface thereof.

26 Claims, 15 Drawing Sheets

OPTICAL IMAGE CAPTURING LENSES

RELATED APPLICATIONS

The application claims priority to Taiwan Application Serial Number 100130316, filed Aug. 24, 2011, which is herein incorporated by reference.

BACKGROUND

1. Technical Field

The present invention relates to an optical image capturing lenses. More particularly, the present invention relates to a compact optical image capturing lenses applicable to electronic products.

2. Description of Related Art

In recent years, with the popularity of mobile products with camera functionalities, the demand for miniaturizing an optical image capturing lenses is increasing. The sensor of a conventional photographing camera is typically a CCD (Charge Coupled Device) or a CMOS (Complementary Metal-Oxide Semiconductor Sensor). As advanced semiconductor manufacturing technologies have allowed the pixel size of sensors to be reduced and compact optical image capturing lenses have gradually evolved toward the fields of higher megapixels, there is an increasing demand for optical image capturing lenses featuring better image quality.

A conventional optical image capturing lenses in a portable electronic product typically utilizes a three-element lens structure. Such a conventional optical image capturing lenses has a first lens element with positive refractive power, a second lens element with negative refractive power and a third lens element with positive refractive power. The first, second and third lens elements are arranged in this order from an object-side to an image-side. Although the three-element lens structure is compact, it is not able to produce high quality images.

Further, another conventional compact optical image capturing lenses provides a four-element lens structure. The first lens element and the second lens element of the four-element lens structure are two glass spherical lens elements which are attached to each other to form a doublet lens for eliminating chromatic aberration. However, this lens structure requires a longer total optical track length caused by insufficient degrees of freedom in setting system parameters due to too many spherical lenses allocated. Moreover, it is not easy to attach the glass lenses, and thus the manufacturing process for forming the glass doublet lenses is difficult. Therefore, a need exists in the art for providing an optical image capturing lenses for use in a mobile electronic product that has excellent imaging quality without too long total track length.

Moreover, the problem of the foregoing optical image capturing lenses is that both of the image quality and the production cost can not be maintained. In detail, two different lenses assemblies should be used when photographing a near object and a far object. However, the difficulty or the cost of the production would be increased by preparing two lenses assemblies or one lenses assembly which can be adjusted.

SUMMARY

According to one aspect of the present disclosure, an optical image capturing lenses includes, in order from an object side to an image side, a front lens group, a stop and a rear lens group. The front lens group includes, in order from an object side to an image side, a first lens element and a second lens element. The first lens element with refractive power has a convex object-side surface and a concave image-side surface. The second lens element has refractive power. The rear lens group includes, in order from an object side to an image side, a third lens element, a fourth lens element, a fifth lens element and a sixth lens element. The third lens element has refractive power. The fourth lens element has refractive power. The fifth lens element has refractive power. The sixth lens element with refractive power is made of plastic, wherein an object-side surface and an image-side surface of the sixth lens element are aspheric, and the sixth lens element has at least one inflection point formed on at least one of the object-side surface and the image-side surface thereof. When a maximal field of view of the optical image capturing lenses is FOV, a maximal negative distortion of the optical image capturing lenses is DIST, and a maximal chief ray angle on an image plane of the optical image capturing lenses is CRAmax, the following relationships are satisfied:

$55 \text{ degrees} < FOV < 90 \text{ degrees};$ $-70\% < DIST < -25\%;$ and $CRAmax < 15 \text{ degrees}.$ According to another aspect of the present disclosure, an optical image capturing lenses includes, in order from an object side to an image side, a front lens group, a stop and a rear lens group. The optical image capturing lenses includes at least five lens elements, wherein at least one lens element of the five lens elements has at least one inflection point formed on at least one of an object-side surface and an image-side surface thereof, and is made of plastic material. When a maximal field of view of the optical image capturing lenses is FOV, a maximal negative distortion of the optical image capturing lenses is DIST, a maximal chief ray angle on an image plane of the optical image capturing lenses is CRAmax, a focal length of the front lens group is ff, and a focal length of the rear lens group is fr, the following relationships are satisfied:

$55 \text{ degrees} < FOV < 90 \text{ degrees};$ $-70\% < DIST < -25\%;$ $CRAmax < 15 \text{ degrees};$ and $-0.5 < fr/ff < -0.1.$ According to further another aspect of the present disclosure, an optical image capturing lenses includes, in order from an object side to an image side, a front lens group, a stop and a rear lens group. The optical image capturing lenses includes at least five lens elements, wherein at least one lens element of the five lens elements is made of plastic material, and has at least one inflection point formed on at least one of an object-side surface and an image-side surface thereof, and the lens element which is nearest to an object is first lens element, the first lens element has a convex object-side surface and a concave image-side surface. When a maximal field of view of the optical image capturing lenses is FOV, a maximal negative distortion of the optical image capturing lenses is DIST, a maximal chief ray angle on an image plane of the optical image capturing lenses is CRAmax, the maximum SAG of the effective aperture on the object-side surface of the first lens element is SAG11, and an effective radius of the object-side surface of the first lens element is YD1, the following relationships are satisfied:

$55 \text{ degrees} < FOV < 90 \text{ degrees};$ $-70\% < DIST < -25\%;$

CRAmax<15 degrees; and 0.3<SAG11/YD1<1.0.

According to yet another aspect of the present disclosure, an optical image capturing lenses includes, in order from an object side to an image side, a front lens group, a stop and a rear lens group. The front lens group includes, in order from an object side to an image side, a first lens element, a second lens element and a third lens element. The first lens element with refractive power has a convex object-side surface and a concave image-side surface. The second lens element has refractive power. The third lens element has refractive power. The rear lens group includes, in order from an object side to an image side, a fourth lens element, a fifth lens element, a sixth lens element and a seventh lens element. The fourth lens element has refractive power. The fifth lens element with positive refractive power has a convex object-side surface and a convex image-side surface. The sixth lens element with negative refractive power has a convex object-side surface and a concave image-side surface, and is made of plastic material, wherein the object-side surface and the image-side surface of the sixth lens element are aspheric. The seventh lens element with positive refractive power has a convex object-side surface and a concave image-side surface, wherein the object-side surface and the image-side surface of the seventh lens element are aspheric, and the seventh lens element has at least one inflection point formed on at least one of the object-side surface and the image-side surface thereof. When a maximal field of view of the optical image capturing lenses is FOV, and a maximal negative distortion of the optical image capturing lenses is DIST, the following relationships are satisfied:

55 degrees<FOV<90 degrees; and

−70%<DIST<−25%.

DETAILED DESCRIPTION

Figure 1:
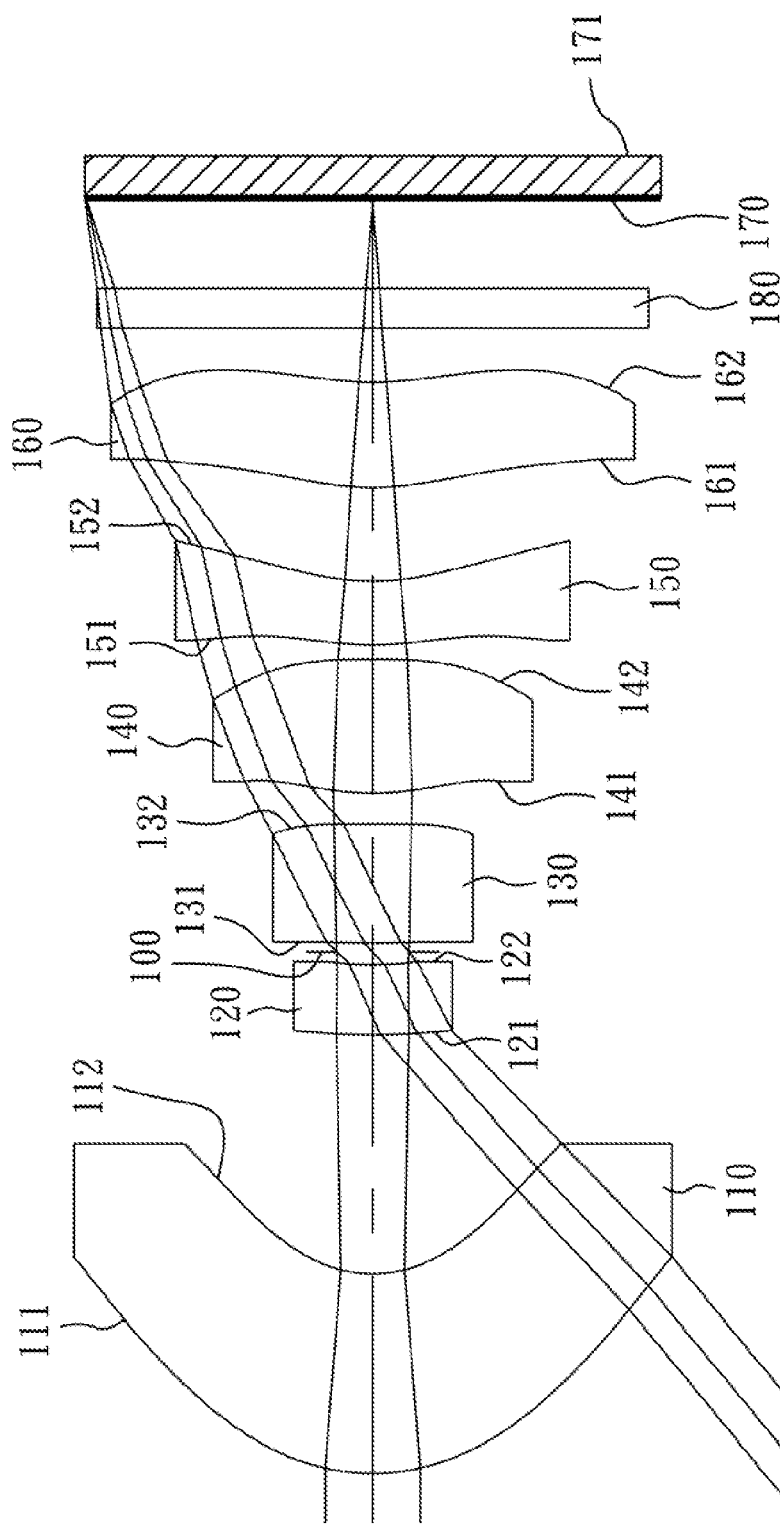
FIG. 1 is a schematic view of an optical image capturing lenses according to the first embodiment of the present disclosure.

An optical image capturing lenses includes, in order from an object side to an image side, a front lens group, a stop and a rear lens group. The optical image capturing lenses further includes an image sensor located on an image plane.

The front lens group includes, in order from an object side to an image side, at least a first lens element and a second lens element. The first lens element with refractive power has a convex object-side surface and a concave image-side surface. Therefore, the astigmatism of the optical image capturing lenses can be corrected for increasing the image quality. The second lens element has refractive power. The rear lens group includes, in order from an object side to an image side, at least a third lens element, a fourth lens element, a fifth lens element and a sixth lens element. The third lens element has refractive power. The fourth lens element with positive refractive power has a convex object-side surface and a convex image-side surface, so that the refractive of the fourth lens element can be enhanced and the total track length of the optical image capturing lenses can be reduced. The fifth lens element with negative refractive power has a convex object-side surface and a concave image-side surface, and is made of plastic material, wherein the object-side surface and the image-side surface of the fifth lens element are aspheric. Therefore, the aberration generated from the lens elements with positive refractive power can be corrected and the astigmatism of the optical image capturing lenses can also be corrected while increasing the image quality and decreasing the production cost effectively. The sixth lens element with positive refractive power has a convex object-side surface and a concave image-side surface, and is made of plastic material, wherein the object-side surface and the image-side surface of the sixth lens element are aspheric, and the sixth lens element has at least one inflection point formed on at least one of the object-side surface and the image-side surface thereof. Therefore, the incident angle of the off-axis field of light on the image sensor can be effectively minimized and the aberration of the off-axis field can be corrected. Furthermore, the sixth lens element can provide partial refractive power for reducing the total track length and the sensitivity of the optical image capturing lenses, so that the production cost can be reduced. At least three lens elements of the foregoing lens elements are made of plastic material, so that the production cost can be reduced. Moreover, the optical image capturing lenses can includes seven lens elements with refractive power. When a maximal field of view of the optical image capturing lenses is FOV, a maximal negative distortion of the optical image capturing lenses is DIST, a maximal chief ray angle on an image plane of the optical image capturing lenses is CRAmax, a focal length of the front lens group is ff, a focal length of the rear lens group is fr, the maximum SAG of the effective aperture on the object-side surface of the first lens element is SAG11, an effective radius of the object-side surface of the first lens element is YD1, a focal length of the optical image capturing lenses is f, a focal length of the first lens element is f1, a central thickness of the first lens element is CT1, a central thickness of the second lens element is CT2, a curvature radius of an object-side surface of the lens element nearest to the image plane with negative refractive power is Rn1, and a curvature radius of an image-side surface of the lens element nearest to the image plane with negative refractive power is Rn2, the following relationships are satisfied:

55 degrees<FOV<90 degrees;

−70%<DIST<−25%; and

CRAmax<15 degrees.

Moreover, according to the different arrangement of the optical image capturing lenses of the present disclosure, the following relationships are satisfied:

−1.0<fr/ff<0.1;

−70%<DIST<−30%;

CRAmax<10 degrees;

−0.5<fr/ff<−0.1;

0.3<SAG11/YD1<1.0;

−0.6<f/f1<0.3;

0.5<SAG11/YD1<0.8;

2.0<CT1/CT2<3.5; and

0<(Rn1−Rn2)/(Rn1+Rn2)<1.5.

According to another embodiment of the present disclosure, the optical image capturing lenses includes at least five lens elements. At least one lens element has at least one inflection point formed on at least one of an object-side surface and an image-side surface thereof, and is made of plastic material. The three lens elements respectively in order from the object side has positive, negative, and positive refractive power, so that the total track length and the sensitivity of the optical image capturing lenses can be reduced. The aberration generated from the lens elements with positive refractive power and the astigmatism of the optical image capturing lenses can be corrected by the lens element with negative refractive power. The lens element with negative refractive power has a convex object-side surface and a concave image-side surface and has at least one inflection point formed on at least one of the object-side surface and the image-side surface thereof. Therefore, the incident angle of the off-axis field of light on the image sensor can be effectively minimized and the aberration of the off-axis field can be corrected. The optical image capturing lenses includes, in order from an object side to an image side, a first lens element and a second lens element. The first lens element has a convex object-side surface and a concave image-side surface. The second lens element has a convex object-side surface and a concave image-side surface. Therefore, the astigmatism of the optical image capturing lenses can be corrected for increasing the image quality. When a maximal field of view of the optical image capturing lenses is FOV, a maximal negative distortion of the optical image capturing lenses is DIST, a maximal chief ray angle on an image plane of the optical image capturing lenses is CRAmax, a focal length of the front lens group is ff, a focal length of the rear lens group is fr, a central thickness of the first lens element is CT1, and a central thickness of the second lens element is CT2, the following relationships are satisfied:

55 degrees<FOV<90 degrees;

−70%<DIST<−25%;

CRAmax<15 degrees; and

−0.5<fr/ff<−0.1.

Moreover, according to the different arrangement of the optical image capturing lenses of the present disclosure, the following relationships are satisfied:

2.0<CT1/CT2<3.5; and

CRAmax<10 degrees.

According to another embodiment of the present disclosure, the optical image capturing lenses includes at least five lens elements. At least one lens element has at least one inflection point formed on at least one of an object-side surface and an image-side surface thereof, and is made of plastic material. Therefore, the incident angle of the off-axis field of light on the image sensor can be effectively minimized and the aberration of the off-axis field can be corrected. The lens element which is nearest to the object is the first lens element. The first lens element has a convex object-side surface and a concave image-side surface, so that the astigmatism of the optical image capturing lenses can be corrected while increasing the image quality. The lens element which is nearest to the image plane has positive refractive power has a convex object-side surface and a concave image-side surface, and has at least one inflection point formed on at least one of the object-side surface and the image-side surface thereof. Therefore, the incident angle of the off-axis field of light on the image sensor can be effectively minimized and the aberration of the off-axis field can be corrected, and the astigmatism also can be corrected for increasing the image quality. The optical image capturing lenses includes, in order from an object side to an image side, the first lens element and the second lens element, wherein the second lens element has a convex object-side surface and a concave image-side surface. Therefore, the astigmatism of the optical image capturing lenses also can be corrected for increasing the image quality. When a maximal field of view of the optical image capturing lenses is FOV, a maximal negative distortion of the optical image capturing lenses is DIST, a maximal chief ray angle on an image plane of the optical image capturing lenses is CRAmax, the maximum SAG of the effective aperture on the object-side surface of the first lens element is SAG11, and an effective radius of the object-side surface of the first lens element is YD1, the following relationships are satisfied:

55 degrees<FOV<90 degrees;

−70%<DIST<−25%;

CRAmax<15 degrees; and 0.3<SAG11/YD1<1.0.

Moreover, according to the different arrangement of the optical image capturing lenses of the present disclosure, the following relationships are to satisfied:

0<($Rn1-Rn2$)/($Rn1+Rn2$)<1.5; and 70 degrees<FOV<80 degrees.

According to yet another embodiment of the present disclosure, the front lens group includes, in order from an object side to an image side, a first lens element, a second lens element and a third lens element. The first lens element with refractive power has a convex object-side surface and a concave image-side surface, so that the astigmatism of the optical image capturing lenses can be corrected for increasing the image quality. The second lens element has refractive power. The third lens element has refractive power. The rear lens group includes, in order from an object side to an image side, a fourth lens element, a fifth lens element, a sixth lens element and a seventh lens element. The fourth lens element has refractive power. The fifth lens element with positive refractive power has a convex object-side surface and a convex image-side surface, so that the refractive power thereof can be enhanced and the total track length of the optical image capturing lenses can be reduced. The sixth lens element with negative refractive power has a convex object-side surface and a concave image-side surface, and is made of plastic material, wherein the object-side surface and the image-side surface of the sixth lens element are aspheric. Therefore, the aberration generated from the lens elements with positive refractive power and the astigmatism of the optical image capturing lenses can be corrected for increasing the image quality. The seventh lens element with positive refractive power has a convex object-side surface and a concave image-side surface, and is made of plastic material, wherein the object-side surface and the image-side surface of the seventh lens element are aspheric, and the seventh lens element has at least one inflection point formed on at least one of the object-side surface and the image-side surface thereof. Therefore, the incident angle of the off-axis field of light on the image sensor can be effectively minimized and the aberration of the off-axis field can be corrected, and the aberration and the sensitivity also can be corrected for increasing the image quality. When a maximal field of view of the optical image capturing lenses is FOV, a maximal negative distortion of the optical image capturing lenses is DIST, a focal length of the optical image capturing lenses is f, and a focal length of the first lens element is f1, the following relationships are satisfied:

55 degrees<FOV<90 degrees; and

−70%<DIST<−25%.

Moreover, according to the different arrangement of the optical image capturing lenses of the present disclosure, the following relationships are satisfied:

CRAmax<15 degrees; and

−0.6<$f/f1$<0.3.

When FOV satisfies the foregoing relationship, the angle of view of the optical image capturing lenses is proper.

When DIST satisfies the foregoing relationship, the distortion and the aberration of the image are proper for satisfying the digital zoom function of the optical image capturing lenses.

When both of FOV and DIST satisfy the foregoing relationships, the optical image capturing lenses has good digital zoom effect for increasing the image quality of digital zoom.

When CRAmax satisfies the foregoing relationship, the images from the far side and the near side can be better focused simultaneously.

When fr/ff satisfies the foregoing relationship, the ratio of the focal length of the front lens group and the focal length of the rear lens group is proper for increasing the field of view, so that the wide-angle function of the optical image capturing lenses can be improved, and the total track length of the optical image capturing lenses is proper.

When SAG11/YD1 satisfies the foregoing relationship, the refractive power of the first lens element is proper which can increase the field of view, so that the wide-angle function of the optical image capturing lenses can be improved.

When f/f1 satisfies the foregoing relationship, the field of view can be increase, so that the wide-angle function of the optical image capturing lenses can be improved.

When CT1/CT2 satisfies the foregoing relationship, the thicknesses of the first lens element and the second lens element are proper, so that the total track length can be reduced, the manufacture of the lens elements is easier and the yield of the manufacture can increased.

According to the optical image capturing lenses of the present disclosure, the lens elements thereof can be made of plastic material or glass. When the lens elements are made of plastic material, the cost of manufacture can be effectively reduced. When the lens elements are made of glass material, the range of the refractive power of the optical image capturing lenses can be set may be increased.

Furthermore, the surface of each lens element can be aspheric, so that it is easier to make the surface into non-spherical shapes. As a result, more controllable variables are obtained, and the aberration is reduced, and the number of required lens elements can be reduced while constructing an optical system. Therefore, the total track length of the optical image capturing lenses can also be reduced.

According to the optical image capturing lenses of the present disclosure, the optical image capturing lenses can include at least one stop, may it be glare stop or field stop, for reducing stray light while retaining high image quality. Furthermore, when the stop is an aperture stop, the position of the aperture stop within an optical system can be arbitrarily placed in front of the entire optical system, within the optical system, including in front of the image plane, in accordance with the preference of the designer of the optical system, in order to achieve the desirable optical features or higher image quality produced from the optical system.

The optical image capturing lenses of the present disclosure can retain high image quality when far shooting or near shooting. Moreover, the image plane can be moved when changing the mode (far side shooting or near side shooting), so that the optical image capturing lenses does not need to set two lens group for far shooting and near shooting.

According to the above description of the present disclosure, the following 1st-7th specific embodiments are provided for further explanation.

Figure 2:
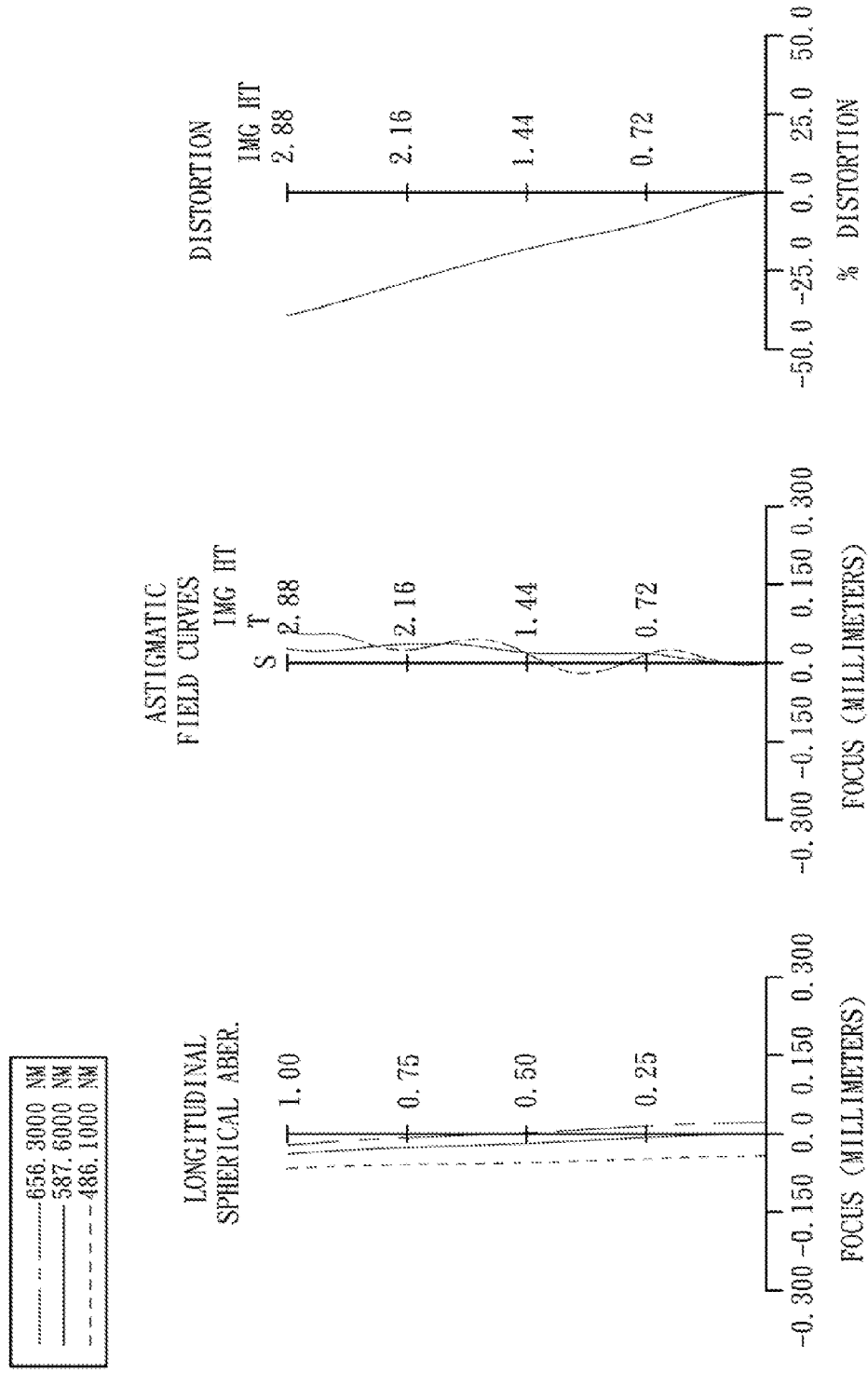
FIG. 2 shows spherical aberration curves, astigmatic field curves and a distortion curve of the optical image capturing lenses according to the first embodiment.

FIG. 1 is a schematic view of an optical image capturing lenses according to the first embodiment of the present disclosure. FIG. 2 shows spherical aberration curves, astigmatic field curves and a distortion curve of the optical image capturing lenses according to the first embodiment. In FIG. 1, the optical image capturing lenses includes, in order from an object side to an image side, the first lens element 110, the second lens element 120, an aperture stop 100, the third lens element 130, the fourth lens element 140, the fifth lens element 150, the sixth lens element 160, an IR (infrared) cut filter 180, an image plane 170 and an image sensor 171. The first lens element 110 and the second lens element 120 belong to a front lens group. The third lens element, the fourth lens element, the fifth lens element and the sixth lens element belong to a rear lens group.

The first lens element 110 with negative refractive power has a convex object-side surface 111 and a concave image-side surface 112, and is made of plastic material. The object-side surface 111 and the image-side surface 112 of the first lens element 110 are aspheric.

The second lens element 120 with negative refractive power has a convex object-side surface 121 and a concave image-side surface 122, and is made of plastic material. The object-side surface 121 and the image-side surface 122 of the second lens element 120 are aspheric.

The third lens element 130 with positive refractive power has a convex object-side surface 131 and a concave image-side surface 132, and is made of plastic material. The object-side surface 131 and the image-side surface 132 of the third lens element 130 are aspheric.

The fourth lens element 140 with positive refractive power has a convex object-side surface 141 and a convex image-side surface 142, and is made of plastic material. The object-side surface 141 and the image-side surface 142 of the fourth lens element 140 are aspheric. Moreover, the fourth lens element 140 has inflection points formed on the object-side surface 141 thereof.

The fifth lens element 150 with negative refractive power has a convex object-side surface 151 and a concave image-side surface 152, and is made of plastic material. The object-side surface 151 and the image-side surface 152 of the fifth lens element 150 are aspheric. Moreover, the fifth lens element 150 has inflection points formed on the object-side surface 151 and the image-side surface 152 thereof.

The sixth lens element 160 with positive refractive power has a convex object-side surface 161 and a concave image-side surface 162, and is made of plastic material. The object-side surface 161 and the image-side surface 162 of the sixth lens element 160 are aspheric. Moreover, the sixth lens element 160 has inflection points formed on the object-side surface 161 and the image-side surface 162 thereof.

The IR cut filter 180 is made of glass and located between the sixth lens element 160 and the image plane 170, and will not affect the focal length of the optical image capturing lenses.

The equation of the aspheric surface profiles of the aforementioned lens elements of the first embodiment is expressed as follows:

$$X(Y) = (Y^2/R)/(1 + sqrt(1 - (1+k) \times (Y/R)^2)) + \sum_i (Ai) \times (Y^i)$$

where:

X is the distance of a point on the aspheric surface spaced at a distance Y from the optical axis relative to the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the optical image capturing lenses according to the first embodiment, when a focal length of the optical image capturing lenses is f, an f-number of the optical image capturing lenses is Fno, a half of the maximal field of view is HFOV, and a maximal field of view of the optical image capturing lenses is FOV, these parameters have the following values:

f=5.72 mm;
Fno=6.00;
HFOV=39.5 degrees; and
FOV=79 degrees.

In the optical image capturing lenses according to the first embodiment, when a central thickness of the first lens element 110 is CT1, and a central thickness of the second lens element 120 is CT2, the following relationship is satisfied:

$CT1/CT2=2.86$.

In the optical image capturing lenses according to the first embodiment, the lens element which is nearest to the image plane 170 and has negative refractive power is the fifth lens element 150, when a curvature radius of an object-side surface 151 thereof is Rn1, and a curvature radius of an image-side surface 152 thereof is Rn2, the following relationship is satisfied:

$(Rn1-Rn2)/(Rn1+Rn2)=0.17$.

In the optical image capturing lenses according to the first embodiment, when a focal length of the optical image capturing lenses is f, and a focal length of the first lens element 110 is f1, the following relationship is satisfied:

$f/f1=-0.23$.

In the optical image capturing lenses according to the first embodiment, when a focal length of the front lens group is ff, and a focal length of the rear lens group is fr, the following relationship is satisfied:

$fr/ff=-0.28$.

In the optical image capturing lenses according to the first embodiment, when a maximal chief ray angle on an image plane 170 of the optical image capturing lenses is CRAmax, wherein the chief ray pass through the center of the aperture stop 100 from the off-axis point, the following relationship is satisfied:

CRAmax=14.6 degrees.

In the optical image capturing lenses according to the first embodiment, when a maximal negative distortion of the optical image capturing lenses is DIST, the following relationship is satisfied:

DIST=−39.0%.

Figure 15:
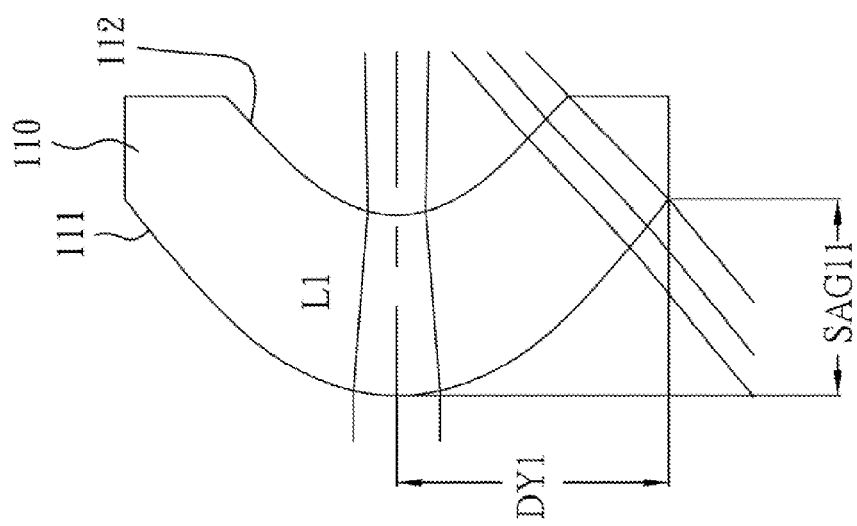
FIG. 15 shows the incident light passing through the first lens element of the optical image capturing lenses according to the first embodiment.

FIG. 15 shows the incident light passing through the first lens element 110 of the optical image capturing lenses according to the first embodiment. In FIG. 15, the maximum SAG of the effective aperture on the object-side surface 111 of the first lens element 110 is SAG11. In other word, a horizontal distance from the position of the maximum range of the incident light which passing through the object-side surface 111 of the first lens element 110 to the vertex of the object-side surface 111 of the first lens element 110 is SAG11 on the optical axis, and an effective radius of the object-side surface 111 of the first lens element 110 is YD1, the following relationship is satisfied:

$SAG11/YD1=0.72$.

The detailed optical data of the first embodiment are shown in Table 1 and the aspheric surface data are shown in Table 2 below.

TABLE 1

1st Embodiment
f = 5.72 mm, Fno = 6.00, HFOV = 39.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.086509 (ASP) | 2.000 | Plastic | 1.535 | 56.3 | −25.41 |
| 2 | | 1.204756 (ASP) | 2.410 | | | | |
| 3 | Lens 2 | 6.331207 (ASP) | 0.700 | Plastic | 1.650 | 21.4 | −15.30 |
| 4 | | 3.699331 (ASP) | 0.128 | | | | |
| 5 | Ape. Stop | Plano | 0.090 | | | | |
| 6 | Lens 3 | 10.808304 (ASP) | 1.194 | Plastic | 1.544 | 55.9 | 27.34 |
| 7 | | 37.984310 (ASP) | 0.310 | | | | |
| 8 | Lens 4 | 2.448117 (ASP) | 1.348 | Plastic | 1.544 | 55.9 | 3.76 |
| 9 | | −10.092182 (ASP) | 0.150 | | | | |
| 10 | Lens 5 | 3.081457 (ASP) | 0.633 | Plastic | 1.650 | 21.4 | −16.50 |
| 11 | | 2.199585 (ASP) | 0.941 | | | | |
| 12 | Lens 6 | 2.348031 (ASP) | 1.058 | Plastic | 1.544 | 55.9 | 20.96 |
| 13 | | 2.487015 (ASP) | 0.550 | | | | |
| 14 | IR-filter | Plano | 0.400 | Glass | 1.517 | 64.2 | — |
| 15 | | Plano | 0.911 | | | | |
| 16 | Image | Plano | — | | | | |

Note:
Reference wavelength (d-line) is 587.6 nm.

TABLE 2

Aspheric Coefficients

| | \multicolumn{6}{c}{Surface #} |
|---|---|---|---|---|---|---|
| | 1 | 2 | 3 | 4 | 6 | 7 |
| k = | −9.33090E−01 | −2.83665E+00 | 1.57309E+01 | 2.46630E+01 | −5.00000E+01 | −5.00000E+01 |
| A4 = | −2.21243E−03 | 1.05200E−01 | −1.30840E−02 | 1.10753E−02 | 6.52771E−02 | −1.35568E−01 |
| A6 = | 2.12556E−03 | −2.77844E−02 | −2.36645E−02 | −3.12519E−01 | −4.51043E−01 | 5.60962E−02 |
| A8 = | −3.87318E−04 | 2.08808E−03 | −7.59805E−03 | 6.59350E−01 | 2.02606E+00 | −4.27656E−02 |
| A10 = | 1.86880E−05 | 1.67973E−05 | 7.30841E−03 | −7.45752E−01 | −3.53581E+00 | 7.56635E−03 |

| | \multicolumn{6}{c}{Surface #} |
|---|---|---|---|---|---|---|
| | 8 | 9 | 10 | 11 | 12 | 13 |
| k = | −7.24415E+00 | −1.41792E+01 | −9.18189E+00 | −9.13512E+00 | −1.68561E+01 | −4.47258E+01 |
| A4 = | −4.52663E−02 | −7.70699E−02 | −6.29945E−02 | −9.63288E−03 | −1.16422E−02 | −6.21272E−03 |
| A6 = | 6.73989E−03 | 1.44426E−02 | 7.32922E−03 | 1.90708E−03 | 3.51857E−04 | −2.70674E−03 |
| A8 = | −5.40128E−03 | −5.90824E−04 | 2.76823E−03 | 2.71157E−05 | 3.38277E−04 | 3.98475E−04 |
| A10 = | | | −5.80205E−04 | −4.38230E−05 | −3.60586E−05 | −7.38041E−06 |
| A12 = | | | | | −2.78886E−07 | −1.53930E−06 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A12 represent the aspheric coefficients ranging from the 1st order to the 12th order. This information related to Table 1 and Table 2 applies also to the Tables for the remaining embodiments, and thus an explanation in this regard will not be provided again.

Figure 3:
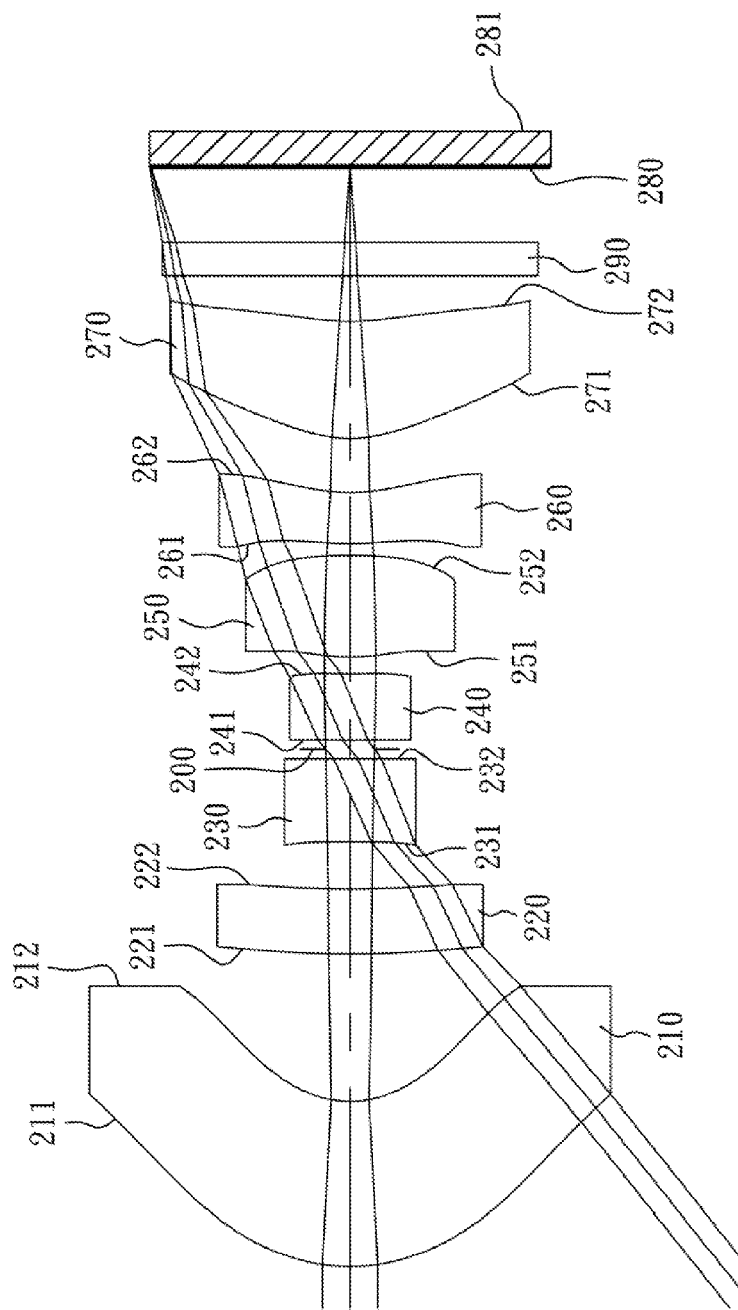
FIG. 3 is a schematic view of an optical image capturing lenses according to the second embodiment of the present disclosure.
Figure 4:
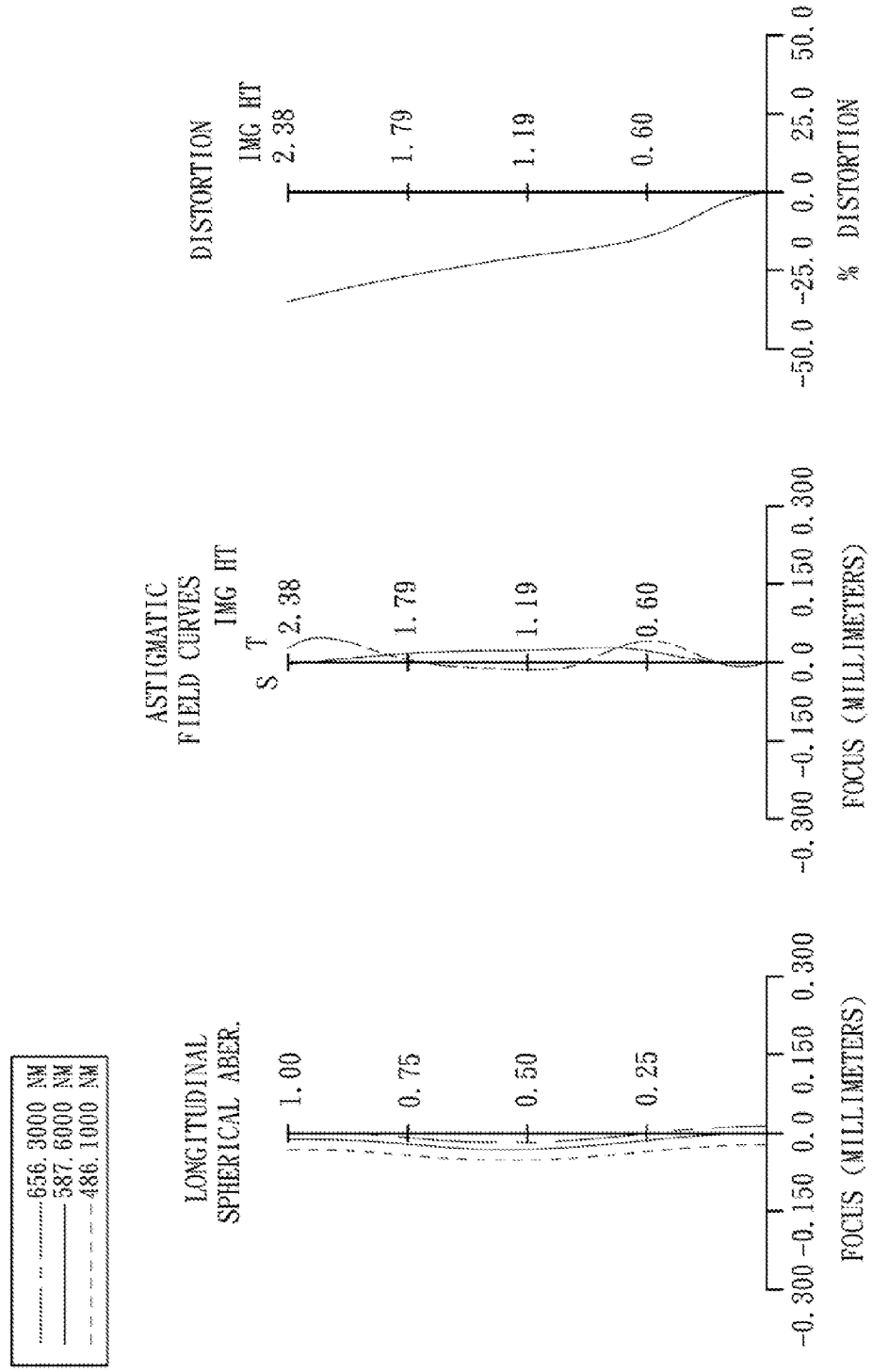
FIG. 4 shows spherical aberration curves, astigmatic field curves and a distortion curve of the optical image capturing lenses according to the second embodiment.

FIG. 3 is a schematic view of an optical image capturing lenses according to the second embodiment of the present disclosure. FIG. 4 shows spherical aberration curves, astigmatic field curves and a distortion curve of the optical image capturing lenses according to the second embodiment. In FIG. 3, the optical image capturing lenses includes, in order from an object side to an image side, the first lens element 210, the second lens element 220, the third lens element 230, an aperture stop 200, the fourth lens element 240, the fifth lens element 250, the sixth lens element 260, the seventh lens element 270, an IR cut filter 290, an image plane 280 and an image sensor 281. The first lens element 210, the second lens element 220 and the third lens element 230 belong to a front lens group. The fourth lens element 240, the fifth lens element 250, the sixth lens element 260 and the seventh lens element 270 belong to a rear lens group.

The first lens element 210 with negative refractive power has a convex object-side surface 211 and a concave image-side surface 212, and is made of plastic material. The object-side surface 211 and the image-side surface 212 of the first lens element 210 are aspheric.

The second lens element 220 with negative refractive power has a convex object-side surface 221 and a concave image-side surface 222, and is made of plastic material. The object-side surface 221 and the image-side surface 222 of the second lens element 220 are aspheric.

The third lens element 230 with negative refractive power has a concave object-side surface 231 and a concave image-side surface 232, and is made of plastic material. The object-side surface 231 and the image-side surface 232 of the third lens element 230 are aspheric.

The fourth lens element 240 with negative refractive power has a convex object-side surface 241 and a concave image-side surface 242, and is made of plastic material. The object-side surface 241 and the image-side surface 242 of the fourth lens element 240 are aspheric.

The fifth lens element 250 with positive refractive power has a convex object-side surface 251 and a convex image-side surface 252, and is made of plastic material. The object-side surface 251 and the image-side surface 252 of the fifth lens element 250 are aspheric. Moreover, the fifth lens element 250 has inflection points formed on the object-side surface 251 thereof.

The sixth lens element 260 with negative refractive power has a convex object-side surface 261 and a concave image-side surface 262, and is made of plastic material. The object-side surface 261 and the image-side surface 262 of the sixth lens element 260 are aspheric. Moreover, the sixth lens element 260 has inflection points formed on the object-side surface 261 and the image-side surface 262 thereof.

The seventh lens element 270 with positive refractive power has a convex object-side surface 271 and a concave image-side surface 272, and is made of plastic material. The object-side surface 271 and the image-side surface 272 of the seventh lens element 270 are aspheric. Moreover, the seventh lens element 270 has inflection points formed on the image-side surface 272 thereof.

The IR cut filter 290 is made of glass and located between the seventh lens element 270 and the image plane 280, and will not affect the focal length of the optical image capturing lenses.

The detailed optical data of the second embodiment are shown in Table 3 and the aspheric surface data are shown in Table 4 below.

TABLE 3

2nd Embodiment
f = 4.61 mm, Fno = 7.00, HFOV = 38.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.206160 (ASP) | 1.973 | Plastic | 1.544 | 55.9 | −19.74 |
| 2 | | 1.253346 (ASP) | 1.768 | | | | |
| 3 | Lens 2 | 14.477784 (ASP) | 0.769 | Plastic | 1.650 | 21.4 | −99.08 |
| 4 | | 11.572322 (ASP) | 0.568 | | | | |
| 5 | Lens 3 | −41.409680 (ASP) | 0.992 | Plastic | 1.535 | 56.3 | −37.72 |
| 6 | | 39.630857 (ASP) | 0.114 | | | | |
| 7 | Ape. Stop | Plano | 0.107 | | | | |
| 8 | Lens 4 | 13.978532 (ASP) | 0.788 | Plastic | 1.544 | 55.9 | −186.80 |
| 9 | | 12.044478 (ASP) | 0.207 | | | | |
| 10 | Lens 5 | 2.424643 (ASP) | 1.206 | Plastic | 1.544 | 55.9 | 3.58 |
| 11 | | −8.127308 (ASP) | 0.150 | | | | |
| 12 | Lens 6 | 4.298053 (ASP) | 0.600 | Plastic | 1.650 | 21.4 | −5.94 |
| 13 | | 1.921967 (ASP) | 0.647 | | | | |
| 14 | Lens 7 | 1.433808 (ASP) | 1.400 | Plastic | 1.544 | 55.9 | 4.58 |
| 15 | | 2.212476 (ASP) | 0.550 | | | | |
| 16 | IR-filter | Plano | 0.400 | Glass | 1.517 | 64.2 | — |
| 17 | | Plano | 0.904 | | | | |
| 18 | Image | Plano | — | | | | |

Note:
Reference wavelength (d-line) is 587.6 nm.

TABLE 4

Aspheric Coefficients

| | Surface # | | | | | | |
|---|---|---|---|---|---|---|---|
| | 1 | 2 | 3 | 4 | 5 | 6 | 8 |
| k = | −8.80549E−01 | −2.13593E+00 | 2.36465E+01 | −1.72132E+01 | 5.00000E+01 | −1.00000E+02 | 5.00000E+01 |
| A4 = | −1.73797E−03 | 9.54804E−02 | 1.34980E−03 | −7.11759E−03 | −8.89742E−02 | −1.48314E−01 | −3.13903E−02 |
| A6 = | 1.98684E−03 | −2.84402E−02 | −2.46154E−04 | −1.03894E−03 | −7.98074E−03 | −8.84638E−02 | −2.03299E+00 |
| A8 = | −3.90415E−04 | 2.24684E−03 | −3.86078E−04 | 1.43932E−03 | 5.16887E−02 | 6.42000E−01 | 1.53431E+01 |
| A10 = | 1.77097E−05 | −3.23989E−06 | | | −2.66000E−02 | −1.35568E+00 | −4.29502E+01 |

| | Surface # | | | | | | |
|---|---|---|---|---|---|---|---|
| | 9 | 10 | 11 | 12 | 13 | 14 | 15 |
| k = | 4.46152E+01 | −1.21157E+01 | 3.14795E+01 | −2.47288E+01 | −1.16100E+01 | −5.59566E+00 | −5.00000E+01 |
| A4 = | −1.94943E−01 | −6.68441E−02 | −9.15225E−02 | −7.78137E−02 | −1.80510E−02 | −6.27769E−04 | −3.90311E−03 |
| A6 = | −1.41164E−02 | −1.80080E−02 | 2.24093E−02 | 7.31816E−03 | 6.90744E−04 | −3.48857E−04 | −7.35430E−04 |
| A8 = | 3.58467E−03 | −1.90471E−02 | −3.57962E−03 | 3.47773E−03 | −1.86583E−04 | 3.72209E−04 | 3.83260E−04 |
| A10 = | 2.91847E−02 | | | −9.16531E−04 | 6.83644E−06 | −3.16997E−05 | −1.17201E−05 |
| A12 = | | | | | | −1.14494E−07 | −1.12308E−06 |

In the optical image capturing lenses according to the second embodiment, the definitions of f, Fno, HFOV, FOV, CT1, CT2, f1, ff, fr, CRAmax, DIST, SAG11 and YD1 are the same as those stated in the first embodiment with corresponding values for the second embodiment. Rn1 and Rn2 are the curvature radius of the surfaces of the sixth lens element 260 which has negative refractive power and is nearest to the image plane 280. Moreover, these parameters can be calculated from Table 3 as the following values and satisfy the following relationships:

| 2nd Embodiment | | | |
|---|---|---|---|
| f(mm) | 4.61 | f/f1 | −0.23 |
| Fno | 7.00 | fr/ff | −0.25 |
| HFOV(deg.) | 38.5 | CRAmax (deg.) | 14.0 |
| FOV (deg.) | 77.0 | DIST [%] | −34.9 |
| CT1/CT2 | 2.57 | SAG11/YD1 | 0.66 |
| (Rn1 − Rn2)/(Rn1 + Rn2) | 0.38 | | |

Figure 5:
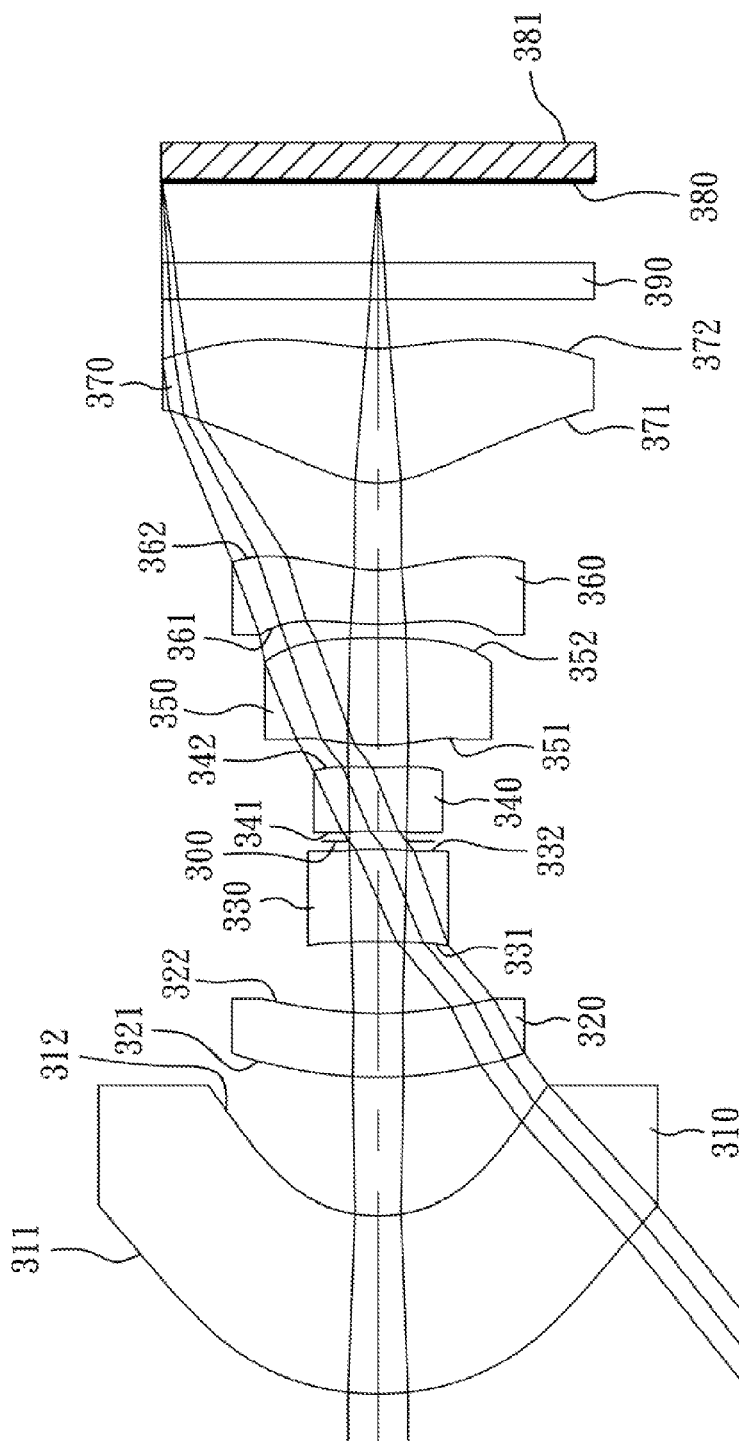
FIG. 5 is a schematic view of an optical image capturing lenses according to the third embodiment of the present disclosure.
Figure 6:
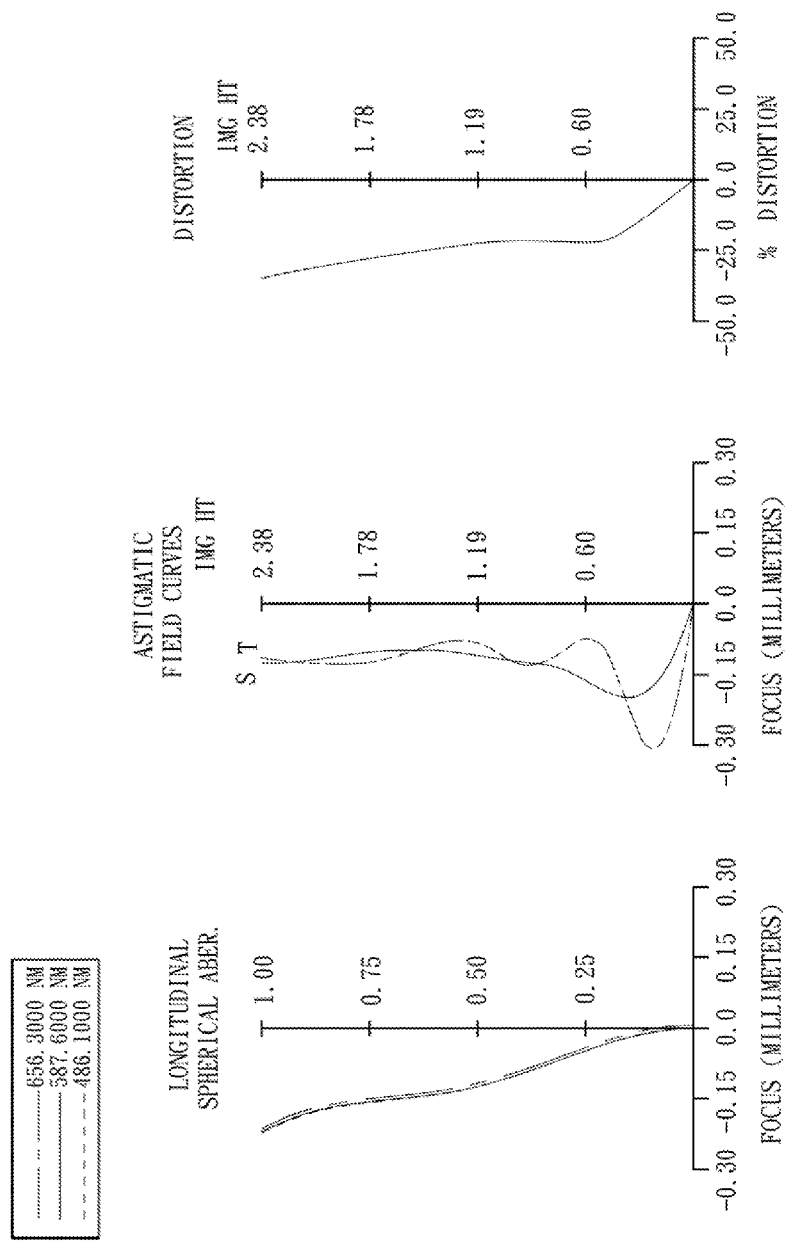
FIG. 6 shows spherical aberration curves, astigmatic field curves and a distortion curve of the optical image capturing lenses according to the third embodiment.

FIG. 5 is a schematic view of an optical image capturing lenses according to the third embodiment of the present disclosure. FIG. 6 shows spherical aberration curves, astigmatic field curves and a distortion curve of the optical image capturing lenses according to the third embodiment. In FIG. 5, the optical image capturing lenses includes, in order from an object side to an image side, the first lens element 310, the second lens element 320, the third lens element 330, an aperture stop 300, the fourth lens element 340, the fifth lens element 350, the sixth lens element 360, the seventh lens element 370, an IR cut filter 390, an image plane 380 and an image sensor 381. The first lens element 310, the second lens element 320 and the third lens element 330 belong to a front lens group. The fourth lens element 340, the fifth lens element 350, the sixth lens element 360 and the seventh lens element 370 belong to a rear lens group.

The first lens element 310 with negative refractive power has a convex object-side surface 311 and a concave image-side surface 312, and is made of plastic material. The object-side surface 311 and the image-side surface 312 of the first lens element 310 are aspheric.

The second lens element 320 with negative refractive power has a convex object-side surface 321 and a concave image-side surface 322, and is made of plastic material. The object-side surface 321 and the image-side surface 322 of the second lens element 320 are aspheric.

The third lens element 330 with positive refractive power has a concave object-side surface 331 and a convex image-side surface 332, and is made of plastic material. The object-side surface 331 and the image-side surface 332 of the third lens element 330 are aspheric.

The fourth lens element 340 with negative refractive power has a concave object-side surface 341 and a concave image-side surface 342, and is made of plastic material. The object-side surface 341 and the image-side surface 342 of the fourth lens element 340 are aspheric.

The fifth lens element 350 with positive refractive power has a convex object-side surface 351 and a convex image-side surface 352, and is made of plastic material. The object-side surface 351 and the image-side surface 352 of the fifth lens element 350 are aspheric. Moreover, the fifth lens element 350 has inflection points formed on the object-side surface 351 thereof.

The sixth lens element 360 with negative refractive power has a convex object-side surface 361 and a concave image-side surface 362, and is made of plastic material. The object-side surface 361 and the image-side surface 362 of the sixth lens element 360 are aspheric. Moreover, the sixth lens element 360 has inflection points formed on the object-side surface 361 and the image-side surface 362 thereof.

The seventh lens element 370 with positive refractive power has a convex object-side surface 371 and a concave image-side surface 372, and is made of plastic material. The object-side surface 371 and the image-side surface 372 of the seventh lens element 370 are aspheric. Moreover, the seventh lens element 370 has inflection points formed on the object-side surface 371 and the image-side surface 372 thereof.

The IR cut filter 390 is made of glass and located between the seventh lens element 370 and the image plane 380, and will not affect the focal length of the optical image capturing lenses.

The detailed optical data of the third embodiment are shown in Table 5 and the aspheric surface data are shown in Table 6 below.

TABLE 5

3rd Embodiment
f = 4.62 mm, Fno = 7.00, HFOV = 38.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.959416 (ASP) | 1.969 | Plastic | 1.535 | 56.3 | −21.92 |
| 2 | | 1.815106 (ASP) | 1.516 | | | | |
| 3 | Lens 2 | 4.662425 (ASP) | 0.700 | Plastic | 1.650 | 21.4 | −29.74 |
| 4 | | 3.534092 (ASP) | 0.796 | | | | |
| 5 | Lens 3 | −21.265512 (ASP) | 1.011 | Plastic | 1.535 | 56.3 | 12.61 |
| 6 | | −5.204419 (ASP) | 0.086 | | | | |
| 7 | Ape. Stop | Plano | 0.114 | | | | |
| 8 | Lens 4 | −16.236668 (ASP) | 0.700 | Plastic | 1.544 | 55.9 | −7.41 |
| 9 | | 5.443969 (ASP) | 0.246 | | | | |
| 10 | Lens 5 | 2.318196 (ASP) | 1.180 | Plastic | 1.544 | 55.9 | 3.50 |
| 11 | | −8.752174 (ASP) | 0.150 | | | | |
| 12 | Lens 6 | 2.878664 (ASP) | 0.600 | Plastic | 1.650 | 21.4 | −4.22 |
| 13 | | 1.288461 (ASP) | 0.953 | | | | |
| 14 | Lens 7 | 1.019347 (ASP) | 1.479 | Plastic | 1.544 | 55.9 | 3.11 |
| 15 | | 1.253942 (ASP) | 0.550 | | | | |

TABLE 5-continued

3rd Embodiment
f = 4.62 mm, Fno = 7.00, HFOV = 38.5 deg.

| Surface # | | Curvature Radius | Thickness | Material | Index | Abbe # | Focal length |
|---|---|---|---|---|---|---|---|
| 16 | IR-filter | Plano | 0.400 | Glass | 1.517 | 64.2 | — |
| 17 | | Plano | 0.899 | | | | |
| 18 | Image | Plano | — | | | | |

Note:
Reference wavelength (d-line) is 587.6 nm.

TABLE 6

Aspheric Coefficients

| | Surface # | | | | | | |
|---|---|---|---|---|---|---|---|
| | 1 | 2 | 3 | 4 | 5 | 6 | 8 |
| k = | −6.66904E−01 | −8.06674E−01 | −5.23609E+00 | −1.92745E+01 | 4.99999E+01 | 3.52522E+00 | 5.00018E+01 |
| A4 = | 8.49057E−03 | 1.09523E−01 | 2.46714E−03 | −1.31458E−02 | −1.00515E−01 | −2.66654E−01 | −2.59507E−01 |
| A6 = | 1.55642E−03 | −2.88681E−02 | −3.03980E−04 | 6.88093E−03 | 5.71899E−02 | 2.76361E−01 | −2.85163E+00 |
| A8 = | −3.97804E−04 | 2.14788E−03 | 2.49245E−04 | 7.60282E−04 | 2.76976E−02 | −1.17633E+00 | 2.16117E+01 |
| A10 = | 1.86872E−05 | −2.92377E−05 | | | −8.92788E−02 | 8.57404E−01 | −5.67360E+01 |

| | Surface # | | | | | | |
|---|---|---|---|---|---|---|---|
| | 9 | 10 | 11 | 12 | 13 | 14 | 15 |
| k = | 5.13390E+00 | −8.10958E+00 | 3.63378E+01 | −5.00000E+01 | −1.78511E+01 | −4.86405E+00 | −5.00000E+01 |
| A4 = | −3.23313E−01 | −6.85279E−02 | −6.44253E−02 | −8.26997E−02 | −3.97196E−02 | −3.47272E−03 | −2.83377E−02 |
| A6 = | −9.53353E−02 | −3.20876E−02 | 1.84405E−02 | −3.83203E−03 | 1.81845E−03 | −1.83918E−03 | 2.74542E−03 |
| A8 = | 1.20016E−01 | −3.92679E−02 | −1.18612E−02 | 1.42459E−03 | 1.39100E−04 | 4.41056E−04 | 1.44976E−04 |
| A10 = | −3.26864E−02 | | | −7.43108E−04 | −5.29977E−05 | −7.24289E−06 | −3.23522E−05 |
| A12 = | | | | | | −3.40028E−06 | 3.02160E−07 |

In the optical image capturing lenses according to the third embodiment, the definitions of f, Fno, HFOV, FOV, CT1, CT2, f1, ff, fr, CRAmax, DIST, SAG11 and YD1 are the same as those stated in the first embodiment with corresponding values for the third embodiment. Rn1 and Rn2 are the curvature radius of the surfaces of the sixth lens element 360 which has negative refractive power and is nearest to the image plane 380. Moreover, these parameters can be calculated from Table 5 as the following values and satisfy the following relationships:

| 3rd Embodiment | | | |
|---|---|---|---|
| f(mm) | 4.62 | f/f1 | −0.21 |
| Fno | 7.00 | fr/ff | −0.01 |
| HFOV(deg.) | 38.5 | CRAmax (deg.) | 4.6 |
| FOV (deg.) | 77.0 | DIST [%] | −35.0 |
| CT1/CT2 | 2.81 | SAG11/YD1 | 0.68 |
| (Rn1 − Rn2)/(Rn1 + Rn2) | 0.38 | | |

Figure 7:
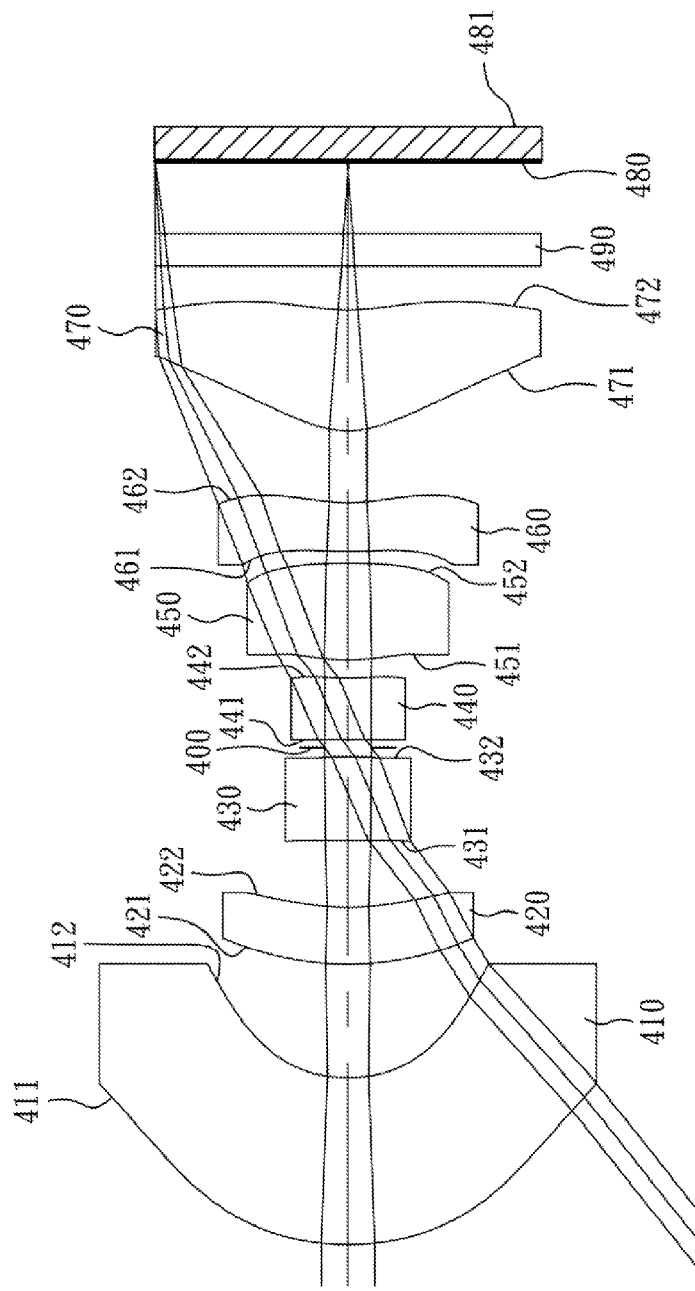
FIG. 7 is a schematic view of an optical image capturing lenses according to the fourth embodiment of the present disclosure.
Figure 8:
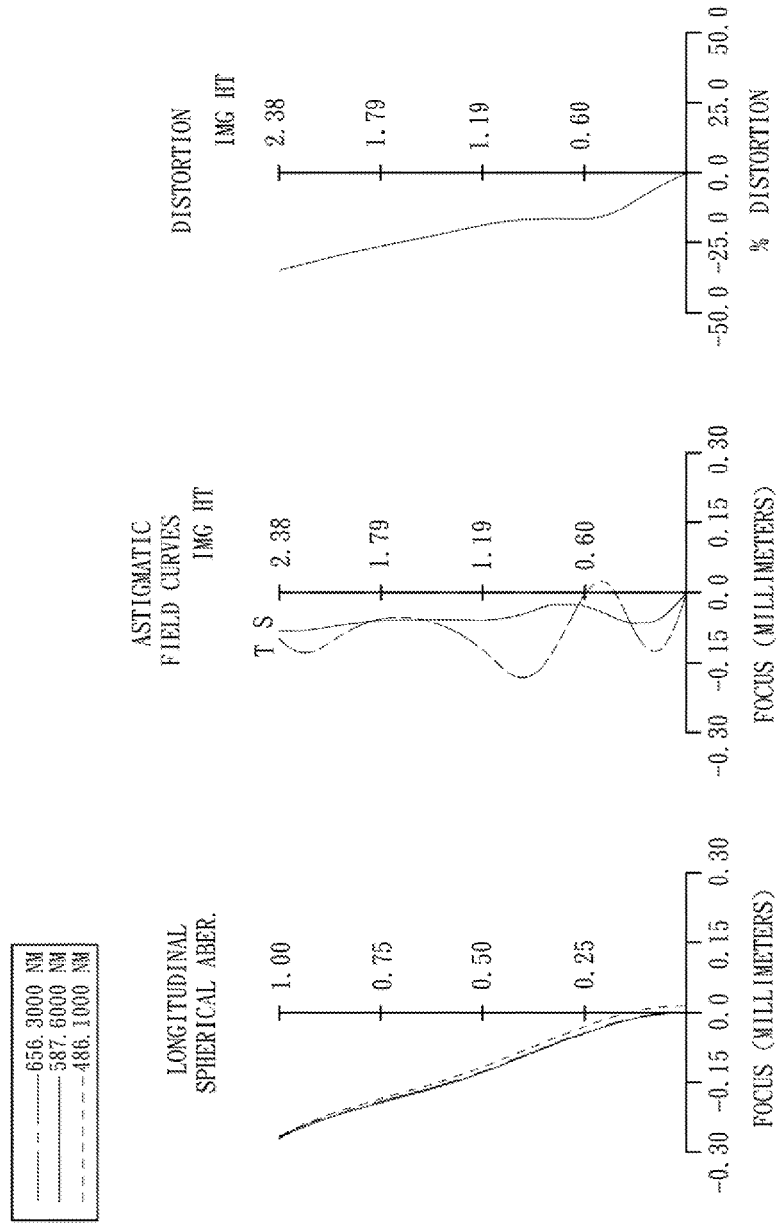
FIG. 8 shows spherical aberration curves, astigmatic field curves and a distortion curve of the optical image capturing lenses according to the fourth embodiment.

FIG. 7 is a schematic view of an optical image capturing lenses according to the fourth embodiment of the present disclosure. FIG. 8 shows spherical aberration curves, astigmatic field curves and a distortion curve of the optical image capturing lenses according to the fourth embodiment. In FIG. 7, the optical image capturing lenses includes, in order from an object side to an image side, the first lens element 410, the second lens element 420, the third lens element 430, an aperture stop 400, the fourth lens element 440, the fifth lens element 450, the sixth lens element 460, the seventh lens element 470, an IR cut filter 490, an image plane 480 and an image sensor 481. The first lens element 410, the second lens element 420 and the third lens element 430 belong to a front lens group. The fourth lens element 440, the fifth lens element 450, the sixth lens element 460 and the seventh lens element 470 belong to a rear lens group.

The first lens element 410 with negative refractive power has a convex object-side surface 411 and a concave image-side surface 412, and is made of plastic material. The object-side surface 411 and the image-side surface 412 of the first lens element 410 are aspheric.

The second lens element 420 with negative refractive power has a convex object-side surface 421 and a concave image-side surface 422, and is to made of plastic material. The object-side surface 421 and the image-side surface 422 of the second lens element 420 are aspheric.

The third lens element 430 with positive refractive power has a convex object-side surface 431 and a convex image-side surface 432, and is made of plastic material. The object-side surface 431 and the image-side surface 432 of the third lens element 430 are aspheric.

The fourth lens element 440 with negative refractive power has a convex object-side surface 441 and a concave image-side surface 442, and is made of plastic material. The object-side surface 441 and the image-side surface 442 of the fourth lens element 440 are aspheric.

The fifth lens element 450 with positive refractive power has a convex object-side surface 451 and a convex image-side surface 452, and is made of plastic material. The object-side surface 451 and the image-side surface 452 of the fifth lens element 450 are aspheric. Moreover, the fifth lens element 450 has inflection points formed on the object-side surface 451 thereof.

The sixth lens element 460 with negative refractive power has a convex object-side surface 461 and a concave image-side surface 462, and is made of plastic material. The object-side surface 461 and the image-side surface 462 of the sixth lens element 460 are aspheric. Moreover, the sixth lens element 460 has inflection points formed on the object-side surface 461 and the image-side surface 462 thereof.

The seventh lens element 470 with positive refractive power has a convex object-side surface 471 and a concave image-side surface 472, and is made of plastic material. The object-side surface 471 and the image-side surface 472 of the seventh lens element 470 are aspheric. Moreover, the seventh lens element 470 has inflection points formed on the object-side surface 471 and the image-side surface 472 thereof.

The IR cut filter 490 is made of glass and located between the seventh lens element 470 and the image plane 480, and will not affect the focal length of the optical image capturing lenses.

The detailed optical data of the fourth embodiment are shown in Table 7 and the aspheric surface data are shown in Table 8 below.

TABLE 7

4th Embodiment
f = 4.61 mm, Fno = 7.00, HFOV = 38.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.114400 (ASP) | 2.062 | Plastic | 1.535 | 56.3 | −29.75 |
| 2 | | 2.003610 (ASP) | 1.387 | | | | |
| 3 | Lens 2 | 3.447928 (ASP) | 0.700 | Plastic | 1.650 | 21.4 | −18.72 |
| 4 | | 2.471691 (ASP) | 0.828 | | | | |
| 5 | Lens 3 | 15.888210 (ASP) | 1.027 | Plastic | 1.535 | 56.3 | 9.90 |
| 6 | | −7.757020 (ASP) | 0.113 | | | | |
| 7 | Ape. Stop | Plano | 0.106 | | | | |
| 8 | Lens 4 | 30.183699 (ASP) | 0.751 | Plastic | 1.544 | 55.9 | −7.80 |
| 9 | | 3.686878 (ASP) | 0.220 | | | | |
| 10 | Lens 5 | 2.383992 (ASP) | 1.191 | Plastic | 1.544 | 55.9 | 3.59 |
| 11 | | −8.966837 (ASP) | 0.150 | | | | |
| 12 | Lens 6 | 8.697503 (ASP) | 0.600 | Plastic | 1.650 | 21.4 | −3.97 |
| 13 | | 1.934436 (ASP) | 0.878 | | | | |
| 14 | Lens 7 | 1.032642 (ASP) | 1.487 | Plastic | 1.544 | 55.9 | 2.81 |
| 15 | | 1.566092 (ASP) | 0.550 | | | | |
| 16 | IR-filter | Plano | 0.400 | Glass | 1.517 | 64.2 | — |
| 17 | | Plano | 0.891 | | | | |
| 18 | Image | Plano | — | | | | |

Note:
Reference wavelength (d-line) is 587.6 nm.

TABLE 8

Aspheric Coefficients

| Surface # | | | | | | |
|---|---|---|---|---|---|---|
| 1 | 2 | 3 | 4 | 5 | 6 | 8 |
| k = −7.90085E−01 | −3.90841E−01 | −5.24394E+00 | −2.00000E+01 | −5.00000E+01 | 1.75058E+01 | 5.00000E+01 |
| A4 = 9.97460E−03 | 1.23594E−01 | 4.83278E−03 | −1.42084E−02 | −1.01915E−01 | −2.82760E−01 | −2.20498E−01 |
| A6 = 1.45115E−03 | −2.68205E−02 | 2.90062E−05 | 7.11017E−03 | 5.68640E−02 | 4.00305E−01 | −2.87048E+00 |
| A8 = −3.95396E−04 | 2.11932E−03 | 3.19915E−04 | 1.20479E−03 | 2.93392E−02 | −2.00840E+00 | 2.30204E+01 |
| A10 = 1.91805E−05 | −9.92264E−05 | | | −8.88621E−02 | 3.45595E+00 | −6.25899E+01 |

| Surface # | | | | | | |
|---|---|---|---|---|---|---|
| 9 | 10 | 11 | 12 | 13 | 14 | 15 |
| k = 1.05690E+01 | −9.02403E+00 | 3.65937E+01 | −4.00132E+01 | −3.11504E+01 | −4.38686E+00 | −4.91761E+01 |
| A4 = −3.19178E−01 | −6.39240E−02 | −5.73492E−02 | −8.73835E−02 | −4.29192E−02 | −5.40488E−04 | −2.33126E−02 |
| A6 = −9.95448E−02 | −3.73047E−02 | 1.84512E−02 | −3.05189E−03 | 1.45610E−03 | −2.04179E−03 | 2.74200E−03 |
| A8 = 1.54264E−01 | −4.14431E−02 | −1.16057E−02 | 1.71439E−03 | 1.73462E−04 | 4.39949E−04 | 1.08498E−04 |
| A10 = −9.90086E−02 | | | −5.11708E−04 | −2.07175E−05 | −3.72317E−06 | −3.43193E−05 |
| A12 = | | | | | −3.54629E−06 | 7.68676E−07 |

In the optical image capturing lenses according to the fourth embodiment, the definitions of f, Fno, HFOV, FOV, CT1, CT2, f1, ff, fr, CRAmax, DIST, SAG11 and YD1 are the same as those stated in the first embodiment with corresponding values for the fourth embodiment. Rn1 and Rn2 are the curvature radius of the surfaces of the sixth lens element 460 which has negative refractive power and is nearest to the image plane 480. Moreover, these parameters can be calculated from Table 7 as the following values and satisfy the following relationships:

| 4th Embodiment | | | |
|---|---|---|---|
| f(mm) | 4.61 | f/f1 | −0.16 |
| Fno | 7.00 | fr/ff | 0.03 |
| HFOV(deg.) | 38.5 | CRAmax (deg.) | 4.4 |
| FOV (deg.) | 77.0 | DIST [%] | −34.9 |
| CT1/CT2 | 2.95 | SAG11/YD1 | 0.65 |
| (Rn1 − Rn2)/(Rn1 + Rn2) | 0.64 | | |

Figure 9:
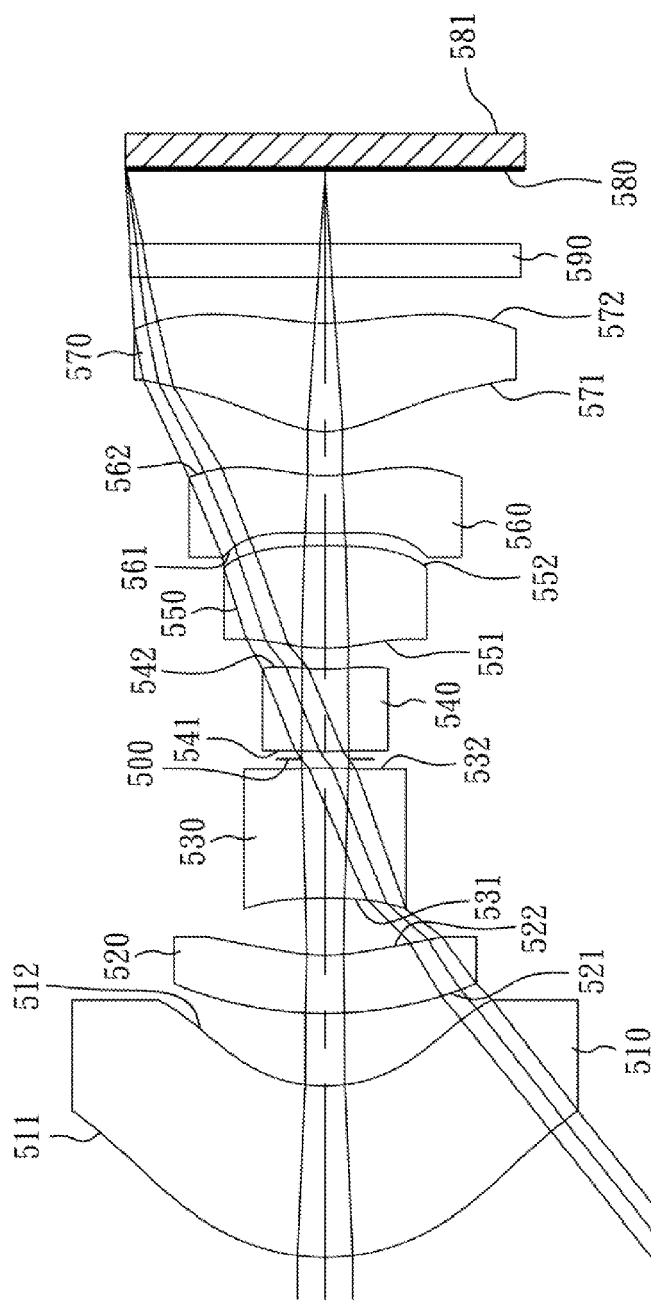
FIG. 9 is a schematic view of an optical image capturing lenses according to the fifth embodiment of the present disclosure.
Figure 10:
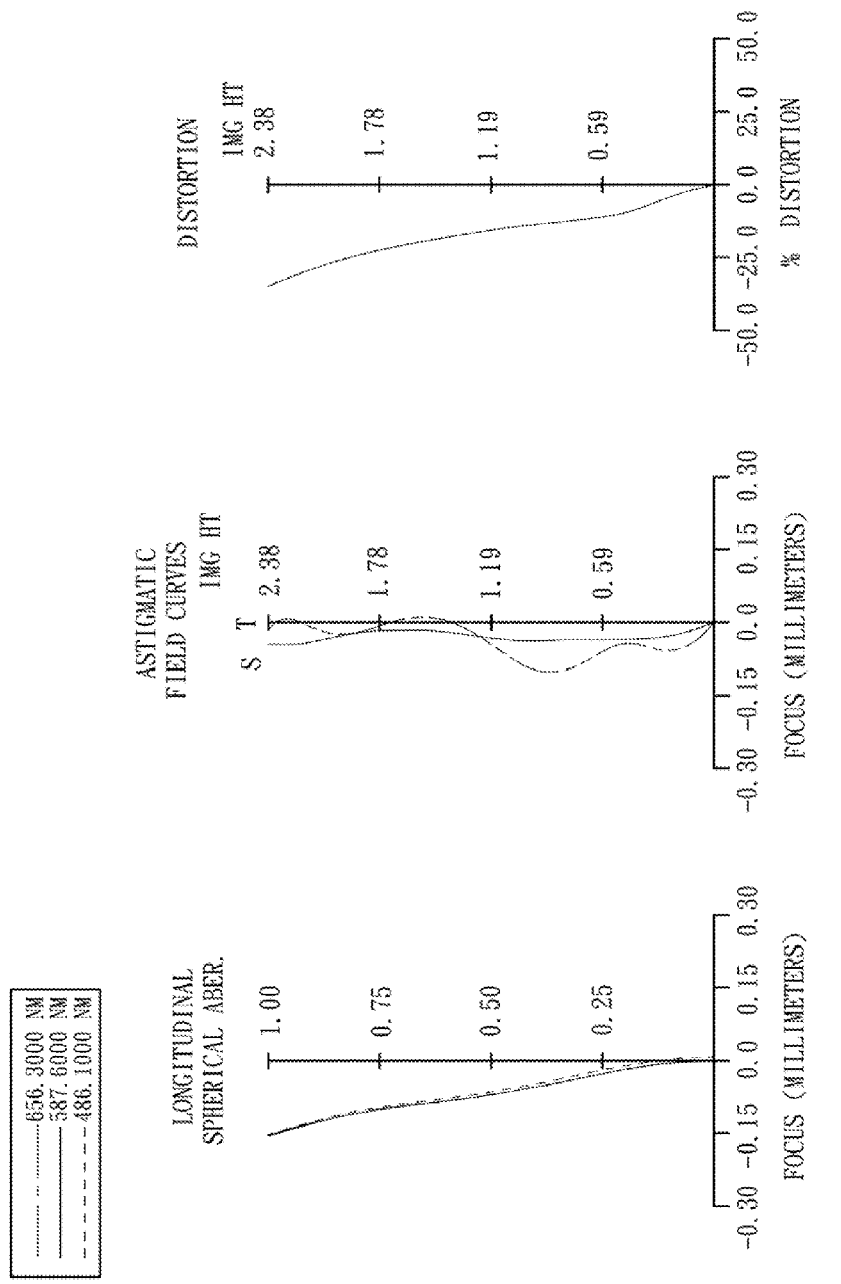
FIG. 10 shows spherical aberration curves, astigmatic field curves and a distortion curve of the optical image capturing lenses according to the fifth embodiment.

FIG. 9 is a schematic view of an optical image capturing lenses according to the fifth embodiment of the present disclosure. FIG. 10 shows spherical aberration curves, astigmatic field curves and a distortion curve of the optical image capturing lenses according to the fifth embodiment. In FIG. 9, the optical image capturing lenses includes, in order from an object side to an image side, the first lens element 510, the second lens element 520, the third lens element 530, an aperture stop 500, the fourth lens element 540, the fifth lens element 550, the sixth lens element 560, the seventh lens element 570, an IR cut filter 590, an image plane 580 and an image sensor 581. The first lens element 510, the second lens element 520 and the third lens element 530 belong to a front lens group. The fourth lens element 540, the fifth lens element 550, the sixth lens element 560 and the seventh lens element 570 belong to a rear lens group.

The first lens element 510 with positive refractive power has a convex object-side surface 511 and a concave image-side surface 512, and is made of plastic material. The object-side surface 511 and the image-side surface 512 of the first lens element 510 are aspheric.

The second lens element 520 with negative refractive power has a convex object-side surface 521 and a concave image-side surface 522, and is made of plastic material. The object-side surface 521 and the image-side surface 522 of the second lens element 520 are aspheric.

The third lens element 530 with negative refractive power has a concave object-side surface 531 and a convex image-side surface 532, and is made of plastic material. The object-side surface 531 and the image-side surface 532 of the third lens element 530 are aspheric.

The fourth lens element 540 with negative refractive power has a convex object-side surface 541 and a concave image-side surface 542, and is made of plastic material. The object-side surface 541 and the image-side surface 542 of the fourth lens element 540 are aspheric.

The fifth lens element 550 with positive refractive power has a convex object-side surface 551 and a convex image-side surface 552, and is made of plastic material. The object-side surface 551 and the image-side surface 552 of the fifth lens element 550 are aspheric. Moreover, the fifth lens element 550 has inflection points formed on the object-side surface 551 thereof.

The sixth lens element 560 with negative refractive power has a convex object-side surface 561 and a concave image-side surface 562, and is made of plastic material. The object-side surface 561 and the image-side surface 562 of the sixth lens element 560 are aspheric. Moreover, the sixth lens element 560 has inflection points formed on the object-side surface 561 and the image-side surface 562 thereof.

The seventh lens element 570 with positive refractive power has a convex object-side surface 571 and a concave image-side surface 572, and is made of plastic material. The object-side surface 571 and the image-side surface 572 of the seventh lens element 570 are aspheric. Moreover, the seventh lens element 570 has inflection points formed on the object-side surface 571 and the image-side surface 572 thereof.

The IR cut filter 590 is made of glass and located between the seventh lens element 570 and the image plane 580, and will not affect the focal length of the optical image capturing lenses.

The detailed optical data of the fifth embodiment are shown in Table 9 and the aspheric surface data are shown in Table 10 below.

TABLE 9

5th Embodiment
f = 4.61 mm, Fno = 7.00, HFOV = 38.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.558346 (ASP) | 2.046 | Plastic | 1.535 | 56.3 | 54.85 |
| 2 | | 2.022127 (ASP) | 0.866 | | | | |
| 3 | Lens 2 | 4.656237 (ASP) | 0.700 | Plastic | 1.614 | 25.6 | −6.79 |
| 4 | | 2.073778 (ASP) | 0.678 | | | | |
| 5 | Lens 3 | −7.922119 (ASP) | 1.557 | Plastic | 1.535 | 56.3 | 39.52 |
| 6 | | −6.156170 (ASP) | 0.111 | | | | |
| 7 | Ape. Stop | Plano | 0.089 | | | | |
| 8 | Lens 4 | 4.241957 (ASP) | 0.981 | Plastic | 1.544 | 55.9 | −39.27 |
| 9 | | 3.250798 (ASP) | 0.254 | | | | |
| 10 | Lens 5 | 2.185827 (ASP) | 1.225 | Plastic | 1.544 | 55.9 | 3.34 |
| 11 | | −8.675449 (ASP) | 0.150 | | | | |
| 12 | Lens 6 | 13.180914 (ASP) | 0.679 | Plastic | 1.614 | 25.6 | −2.90 |
| 13 | | 1.536786 (ASP) | 0.527 | | | | |
| 14 | Lens 7 | 0.949471 (ASP) | 1.293 | Plastic | 1.544 | 55.9 | 2.38 |
| 15 | | 1.843935 (ASP) | 0.557 | | | | |

TABLE 9-continued

5th Embodiment
f = 4.61 mm, Fno = 7.00, HFOV = 38.5 deg.

| Surface # | | Curvature Radius | Thickness | Material | Index | Abbe # | Focal length |
|---|---|---|---|---|---|---|---|
| 16 | IR-filter | Plano | 0.400 | Glass | 1.517 | 64.2 | — |
| 17 | | Plano | 0.894 | | | | |
| 18 | Image | Plano | — | | | | |

Note:
Reference wavelength (d-line) is 587.6 nm.

TABLE 10

Aspheric Coefficients

| | Surface # | | | | | | |
|---|---|---|---|---|---|---|---|
| | 1 | 2 | 3 | 4 | 5 | 6 | 8 |
| k = | −1.15755E+00 | −3.82916E−01 | −1.85403E+00 | −1.50199E+01 | 3.55540E+01 | 2.00000E+01 | 6.33300E+00 |
| A4 = | 6.50322E−03 | 6.72099E−02 | −2.19758E−04 | −2.31974E−02 | −1.31992E−01 | −2.36455E−01 | −2.30529E−01 |
| A6 = | 1.22218E−03 | −2.83902E−02 | 9.78060E−05 | 2.55145E−03 | 8.05976E−02 | 4.14719E−01 | −2.66520E+00 |
| A8 = | −3.87204E−04 | 2.16689E−03 | 1.76835E−04 | 1.98541E−03 | −1.03851E−02 | −4.77934E−01 | 3.17896E+01 |
| A10 = | 2.01527E−05 | 3.61587E−06 | | | −1.79989E−03 | 2.92045E−01 | −1.20124E+02 |

| | Surface # | | | | | | |
|---|---|---|---|---|---|---|---|
| | 9 | 10 | 11 | 12 | 13 | 14 | 15 |
| k = | 1.06812E+01 | −7.53314E+00 | 3.94629E+01 | −4.47825E+00 | −2.48475E+01 | −5.40697E+00 | −5.00000E+01 |
| A4 = | −3.02669E−01 | −3.55566E−02 | −8.23500E−02 | −1.32388E−01 | −5.07720E−02 | −1.32573E−02 | −1.69160E−02 |
| A6 = | −7.47478E−02 | −2.83389E−02 | 2.38892E−02 | −2.18380E−02 | 7.77131E−04 | −1.04154E−03 | 5.97355E−04 |
| A8 = | 1.73000E−01 | −1.32474E−02 | −1.11130E−02 | 5.10373E−03 | 4.39629E−04 | 4.52290E−04 | 1.17868E−04 |
| A10 = | −2.11402E−01 | | | −1.55294E−03 | 1.84802E−04 | 5.24114E−06 | −2.83144E−05 |
| A12 = | | | | | | −4.48681E−06 | 1.73524E−06 |

In the optical image capturing lenses according to the fifth embodiment, the definitions of f, Fno, HFOV, FOV, CT1, CT2, f1, ff, fr, CRAmax, DIST, SAG11 and YD1 are the same as those stated in the first embodiment with corresponding values for the fifth embodiment. Rn1 and Rn2 are the curvature radius of the surfaces of the sixth lens element 560 which has negative refractive power and is nearest to the image plane 580. Moreover, these parameters can be calculated from Table 9 as the following values and satisfy the following relationships:

| 5th Embodiment | | | |
|---|---|---|---|
| f(mm) | 4.61 | f/f1 | 0.08 |
| Fno | 7.00 | fr/ff | −0.19 |
| HFOV(deg.) | 38.5 | CRAmax (deg.) | 10.0 |
| FOV (deg.) | 77.0 | DIST [%] | −34.9 |
| CT1/CT2 | 2.92 | SAG11/YD1 | 0.58 |
| (Rn1 − Rn2)/(Rn1 + Rn2) | 0.79 | | |

Figure 11:
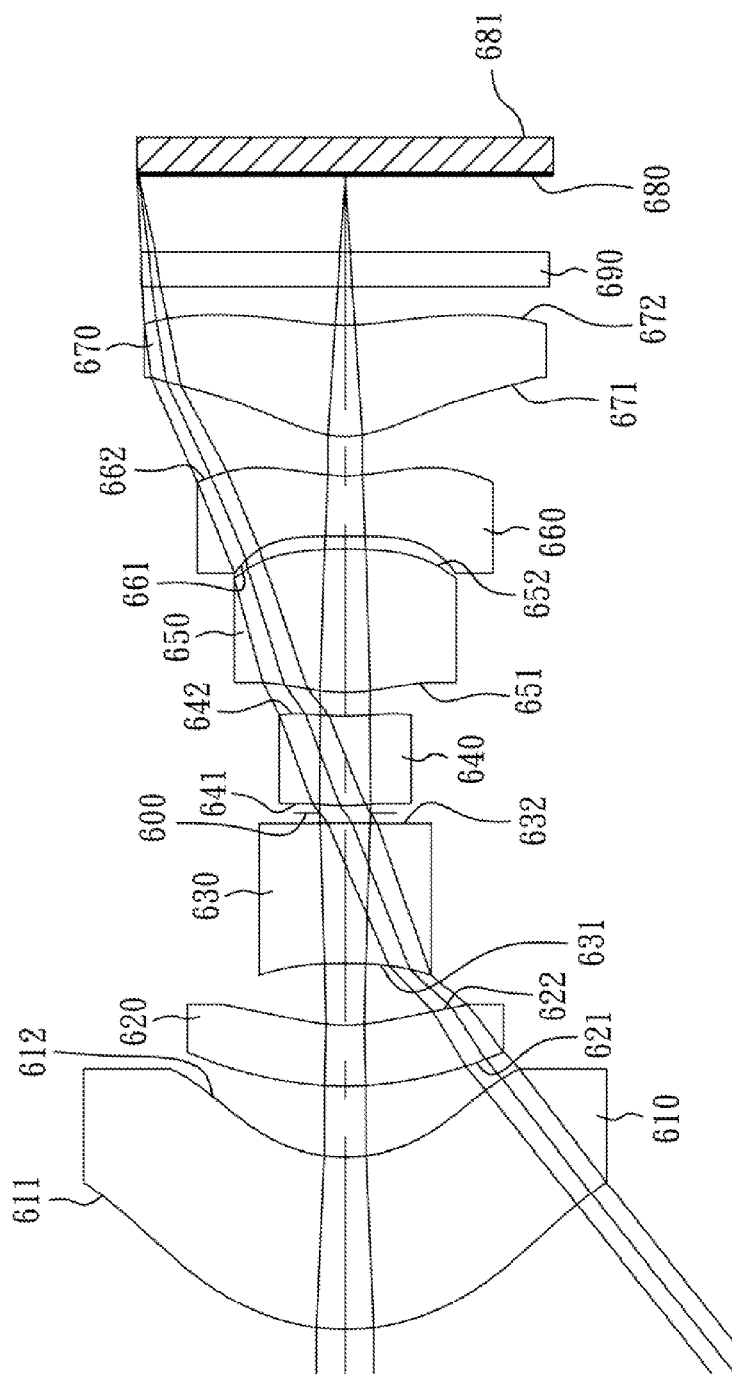
FIG. 11 is a schematic view of an optical image capturing lenses according to the sixth embodiment of the present disclosure.
Figure 12:
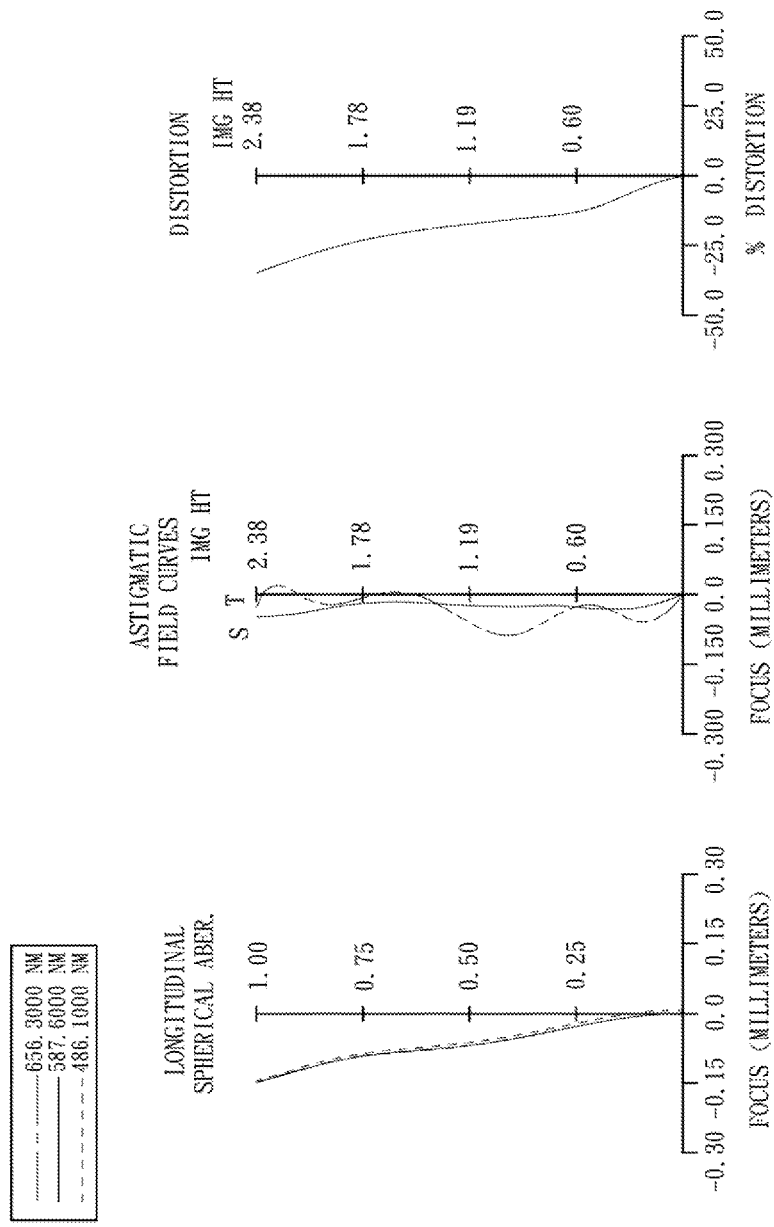
FIG. 12 shows spherical aberration curves, astigmatic field curves and a distortion curve of the optical image capturing lenses according to the sixth embodiment.

FIG. 11 is a schematic view of an optical image capturing lenses according to the sixth embodiment of the present disclosure. FIG. 12 shows spherical aberration curves, astigmatic field curves and a distortion curve of the optical image capturing lenses according to the sixth embodiment. In FIG. 11, the optical image capturing lenses includes, in order from an object side to an image side, the first lens element 610, the second lens element 620, the third lens element 630, an aperture stop 600, the fourth lens element 640, the fifth lens element 650, the sixth lens element 660, the seventh lens element 670, an IR cut filter 690, an image plane 680 and an image sensor 681. The first lens element 610, the second lens element 620 and the third lens element 630 belong to a front lens group. The fourth lens element 640, the fifth lens element 650, the sixth lens element 660 and the seventh lens element 670 belong to a rear lens group.

The first lens element 610 with positive refractive power has a convex object-side surface 611 and a concave image-side surface 612, and is made of plastic material. The object-side surface 611 and the image-side surface 612 of the first lens element 610 are aspheric.

The second lens element 620 with negative refractive power has a convex object-side surface 621 and a concave image-side surface 622, and is made of plastic material. The object-side surface 621 and the image-side surface 622 of the second lens element 620 are aspheric.

The third lens element 630 with negative refractive power has a concave object-side surface 631 and a concave image-side surface 632, and is made of plastic material. The object-side surface 631 and the image-side surface 632 of the third lens element 630 are aspheric.

The fourth lens element 640 with positive refractive power has a convex object-side surface 641 and a concave image-side surface 642, and is made of plastic material. The object-side surface 641 and the image-side surface 642 of the fourth lens element 640 are aspheric.

The fifth lens element 650 with positive refractive power has a convex object-side surface 651 and a convex image-side surface 652, and is made of plastic material. The object-side surface 651 and the image-side surface 652 of the fifth lens element 650 are aspheric. Moreover, the fifth lens element 650 has inflection points formed on the object-side surface 651 thereof.

The sixth lens element 660 with negative refractive power has a concave object-side surface 661 and a concave image-side surface 662, and is made of plastic material. The object-side surface 661 and the image-side surface 662 of the sixth lens element 660 are aspheric. Moreover, the sixth lens element 660 has inflection points formed on the object-side surface 661 and the image-side surface 662 thereof.

The seventh lens element 670 with positive refractive power has a convex object-side surface 671 and a concave image-side surface 672, and is made of plastic material. The object-side surface 671 and the image-side surface 672 of the seventh lens element 670 are aspheric. Moreover, the seventh lens element 670 has inflection points formed on the object-side surface 671 and the image-side surface 672 thereof.

The IR cut filter 690 is made of glass and located between the seventh lens element 670 and the image plane 680, and will not affect the focal length of the optical image capturing lenses.

The detailed optical data of the sixth embodiment are shown in Table 11 and the aspheric surface data are shown in Table 12 below.

TABLE 11

6th Embodiment
f = 4.61 mm, Fno = 7.00, HFOV = 38.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.564968 (ASP) | 1.987 | Plastic | 1.530 | 55.8 | 54.86 |
| 2 | | 2.058261 (ASP) | 0.811 | | | | |
| 3 | Lens 2 | 3.886640 (ASP) | 0.700 | Plastic | 1.614 | 25.6 | −6.55 |
| 4 | | 1.840862 (ASP) | 0.710 | | | | |
| 5 | Lens 3 | −7.650501 (ASP) | 1.615 | Plastic | 1.535 | 56.3 | −11.91 |
| 6 | | 40.765846 (ASP) | 0.117 | | | | |
| 7 | Ape. Stop | Plano | 0.083 | | | | |
| 8 | Lens 4 | 2.275256 (ASP) | 1.034 | Plastic | 1.544 | 55.9 | 10.23 |
| 9 | | 3.232066 (ASP) | 0.273 | | | | |
| 10 | Lens 5 | 2.120035 (ASP) | 1.650 | Plastic | 1.544 | 55.9 | 3.25 |
| 11 | | −7.778525 (ASP) | 0.150 | | | | |
| 12 | Lens 6 | −43.662185 (ASP) | 0.690 | Plastic | 1.614 | 25.6 | −2.74 |
| 13 | | 1.761903 (ASP) | 0.452 | | | | |
| 14 | Lens 7 | 0.990872 (ASP) | 1.280 | Plastic | 1.544 | 55.9 | 2.50 |
| 15 | | 1.991869 (ASP) | 0.450 | | | | |
| 16 | IR-filter | Plano | 0.400 | Glass | 1.517 | 64.2 | — |
| 17 | | Plano | 0.894 | | | | |
| 18 | Image | Plano | — | | | | |

Note:
Reference wavelength (d-line) is 587.6 nm.

TABLE 12

Aspheric Coefficients

| | Surface # | | | | | | |
|---|---|---|---|---|---|---|---|
| | 1 | 2 | 3 | 4 | 5 | 6 | 8 |
| k = | −1.26767E+00 | −3.80803E−01 | −3.46093E+00 | −1.11629E+01 | 2.48768E+01 | 2.00000E+01 | 2.04228E+00 |
| A4 = | 6.16446E−03 | 6.67749E−02 | −1.78186E−03 | −2.30203E−02 | −1.28054E−01 | −3.02979E−01 | −2.51831E−01 |
| A6 = | 1.24005E−03 | −2.83454E−02 | 1.53412E−04 | 1.21697E−03 | 7.86739E−02 | 5.90778E−01 | −2.60579E+00 |
| A8 = | −3.85683E−04 | 2.19225E−03 | 2.23530E−04 | 2.13376E−03 | −1.61971E−02 | −1.92975E+00 | 3.00313E+01 |
| A10 = | 2.02990E−05 | 9.02400E−06 | | | 1.29120E−03 | 6.63586E+00 | −1.09487E+02 |

| | Surface # | | | | | | |
|---|---|---|---|---|---|---|---|
| | 9 | 10 | 11 | 12 | 13 | 14 | 15 |
| k = | 9.54250E+00 | −7.76544E+00 | 2.11469E+01 | 3.19251E+01 | −2.43762E+01 | −4.71919E+00 | −5.00000E+01 |
| A4 = | −2.93807E−01 | −3.97789E−02 | −1.07520E−01 | −1.20983E−01 | −5.37849E−02 | −1.48864E−02 | −1.22842E−01 |
| A6 = | −2.69030E−02 | −2.53026E−02 | 3.05348E−02 | −3.38065E−02 | 6.06328E−04 | −8.20607E−04 | 2.89124E−04 |
| A8 = | 1.59728E−01 | −1.11466E−03 | −9.79234E−03 | 6.13896E−03 | 4.27572E−04 | 4.54235E−04 | 1.19916E−04 |
| A10 = | −2.27773E−01 | | | 9.59411E−04 | 2.44904E−04 | 6.43179E−06 | −2.47917E−05 |
| A12 = | | | | | | −4.12729E−06 | 1.63316E−06 |

In the optical image capturing lenses according to the sixth embodiment, the definitions of f, Fno, HFOV, FOV, CT1, CT2, f1, ff, fr, CRAmax, DIST, SAG11 and YD1 are the same as those stated in the first embodiment with corresponding values for the sixth embodiment. Rn1 and Rn2 are the curvature radius of the surfaces of the sixth lens element 660 which has negative refractive power and is nearest to the image plane 680. Moreover, these parameters can be calculated from Table 11 as the following values and satisfy the following relationships:

| 6th Embodiment | | | |
|---|---|---|---|
| f(mm) | 4.61 | f/f1 | 0.08 |
| Fno | 7.00 | fr/ff | −0.42 |
| HFOV(deg.) | 38.5 | CRAmax (deg.) | 9.9 |
| FOV (deg.) | 77.0 | DIST [%] | −34.9 |
| CT1/CT2 | 2.84 | SAG11/YD1 | 0.56 |
| (Rn1 − Rn2)/(Rn1 + Rn2) | 1.09 | | |

Figure 13:
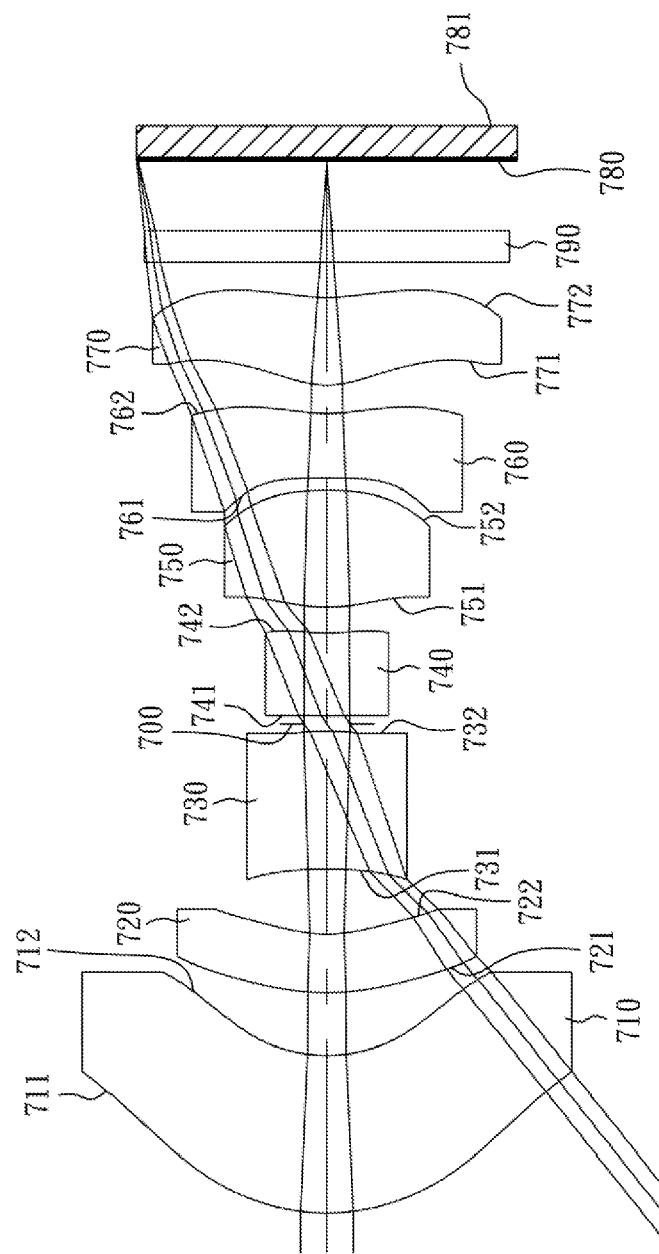
FIG. 13 is a schematic view of an optical image capturing lenses according to the seventh embodiment of the present disclosure.
Figure 14:
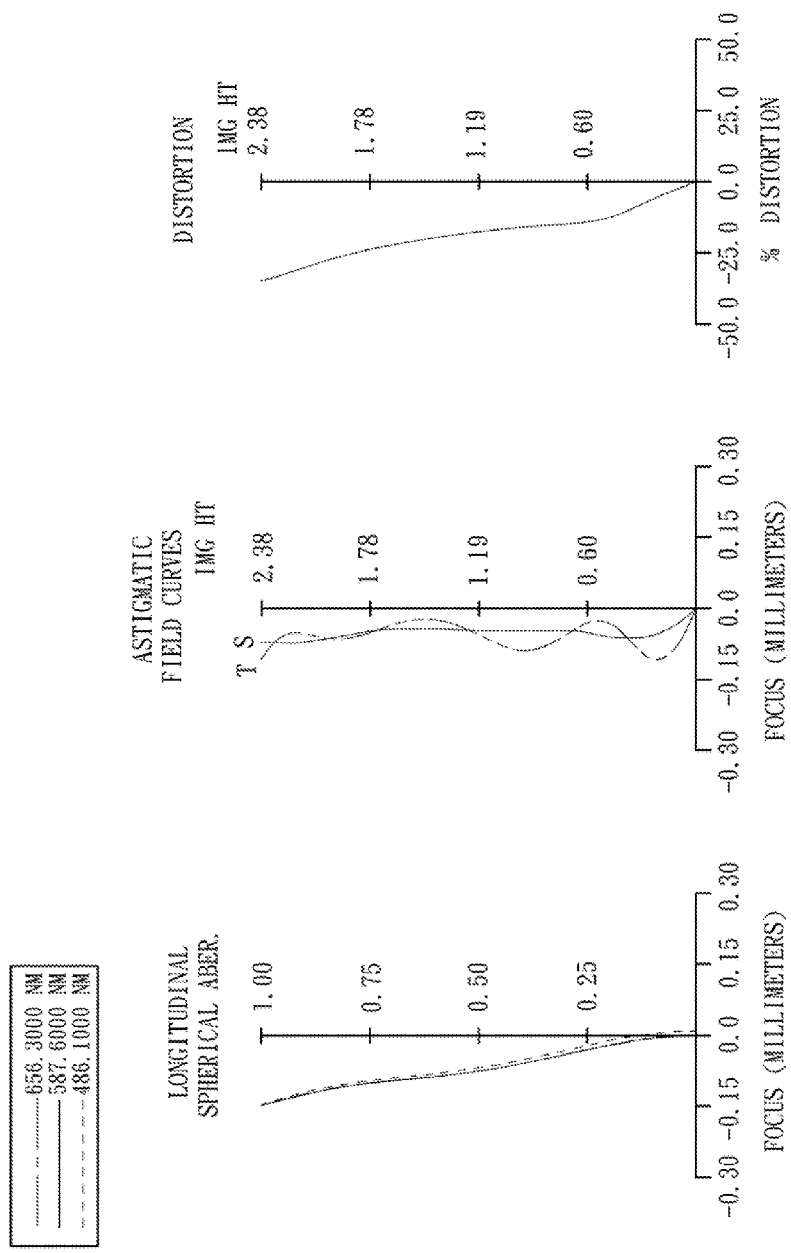
FIG. 14 shows spherical aberration curves, astigmatic field curves and a distortion curve of the optical image capturing lenses according to the seventh embodiment.

FIG. 13 is a schematic view of an optical image capturing lenses according to the seventh embodiment of the present disclosure. FIG. 14 shows spherical aberration curves, astigmatic field curves and a distortion curve of the optical image capturing lenses according to the seventh embodiment. In FIG. 13, the optical image capturing lenses includes, in order from an object side to an image side, the first lens element 710, the second lens element 720, the third lens element 730, an aperture stop 700, the fourth lens element 740, the fifth lens element 750, the sixth lens element 760, the seventh lens element 770, an IR cut filter 790, an image plane 780 and an image sensor 781. The first lens element 710, the second lens element 720 and the third lens element 730 belong to a front lens group. The fourth lens element 740, the fifth lens element 750, the sixth lens element 760 and the seventh lens element 770 belong to a rear lens group.

The first lens element 710 with positive refractive power has a convex object-side surface 711 and a concave image-side surface 712, and is made of plastic material. The object-side surface 711 and the image-side surface 712 of the first lens element 710 are aspheric.

The second lens element 720 with negative refractive power has a convex object-side surface 721 and a concave image-side surface 722, and is made of plastic material. The object-side surface 721 and the image-side surface 722 of the second lens element 720 are aspheric.

The third lens element 730 with positive refractive power has a concave object-side surface 731 and a convex image-side surface 732, and is made of plastic material. The object-side surface 731 and the image-side surface 732 of the third lens element 730 are aspheric.

The fourth lens element 740 with negative refractive power has a convex object-side surface 741 and a concave image-side surface 742, and is made of plastic material. The object-side surface 741 and the image-side surface 742 of the fourth lens element 740 are aspheric.

The fifth lens element 750 with positive refractive power has a convex object-side surface 751 and a convex image-side surface 752, and is made of plastic material. The object-side surface 751 and the image-side surface 752 of the fifth lens element 750 are aspheric. Moreover, the fifth lens element 750 has inflection points formed on the object-side surface 751 thereof.

The sixth lens element 760 with negative refractive power has a concave object-side surface 761 and a concave image-side surface 762, and is made of plastic material. The object-side surface 761 and the image-side surface 762 of the sixth lens element 760 are aspheric. Moreover, the sixth lens element 760 has inflection points formed on the image-side surface 762 thereof.

The seventh lens element 770 with positive refractive power has a convex object-side surface 771 and a concave image-side surface 772, and is made of plastic material. The object-side surface 771 and the image-side surface 772 of the seventh lens element 770 are aspheric. Moreover, the seventh lens element 770 has inflection points formed on the object-side surface 771 and the image-side surface 772 thereof.

The IR cut filter 790 is made of glass and located between the seventh lens element 770 and the image plane 780, and will not affect the focal length of the optical image capturing lenses.

The detailed optical data of the seventh embodiment are shown in Table 13 and the aspheric surface data are shown in Table 14 below.

TABLE 13

7th Embodiment
f = 4.61 mm, Fno = 7.00, HFOV = 38.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.607357 (ASP) | 1.982 | Plastic | 1.530 | 55.8 | 56.30 |
| 2 | | 2.104843 (ASP) | 0.786 | | | | |
| 3 | Lens 2 | 3.071470 (ASP) | 0.736 | Plastic | 1.614 | 25.6 | −6.72 |
| 4 | | 1.600401 (ASP) | 0.813 | | | | |
| 5 | Lens 3 | −7.966329 (ASP) | 1.735 | Plastic | 1.530 | 55.8 | 9.92 |
| 6 | | −3.405581 (ASP) | 0.102 | | | | |
| 7 | Ape. Stop | Plano | 0.098 | | | | |
| 8 | Lens 4 | 8.706769 (ASP) | 1.035 | Plastic | 1.544 | 55.9 | −10.95 |
| 9 | | 3.389086 (ASP) | 0.330 | | | | |
| 10 | Lens 5 | 2.287129 (ASP) | 1.464 | Plastic | 1.544 | 55.9 | 2.95 |
| 11 | | −4.181045 (ASP) | 0.150 | | | | |
| 12 | Lens 6 | −19.422994 (ASP) | 0.810 | Plastic | 1.614 | 25.6 | −2.57 |
| 13 | | 1.747843 (ASP) | 0.354 | | | | |
| 14 | Lens 7 | 0.934868 (ASP) | 1.101 | Plastic | 1.544 | 55.9 | 2.63 |
| 15 | | 1.581869 (ASP) | 0.450 | | | | |

TABLE 13-continued

7th Embodiment
f = 4.61 mm, Fno = 7.00, HFOV = 38.5 deg.

| Surface # | | Curvature Radius | Thickness | Material | Index | Abbe # | Focal length |
|---|---|---|---|---|---|---|---|
| 16 | IR-filter | Plano | 0.400 | Glass | 1.517 | 64.2 | — |
| 17 | | Plano | 0.894 | | | | |
| 18 | Image | Plano | — | | | | |

Note:
Reference wavelength (d-line) is 587.6 nm.

TABLE 14

Aspheric Coefficients

| | Surface # | | | | | | |
|---|---|---|---|---|---|---|---|
| | 1 | 2 | 3 | 4 | 5 | 6 | 8 |
| k = | −1.21043E+00 | −3.69303E−01 | −5.20080E+00 | −7.91577E+00 | 7.60001E+00 | −6.27221E+00 | −4.60529E+01 |
| A4 = | 6.29535E−03 | 6.73096E−02 | −4.28562E−03 | −2.47002E−02 | −1.19981E−01 | −2.86077E−01 | −2.58597E−01 |
| A6 = | 1.27726E−03 | −2.80677E−02 | 2.85291E−04 | 8.35532E−05 | 7.57241E−02 | 7.85768E−01 | −2.42393E+00 |
| A8 = | −3.85460E−04 | 2.23174E−03 | 3.44922E−04 | 4.16647E−03 | −2.17726E−02 | −3.62683E+00 | 2.86448E+01 |
| A10 = | 2.02332E−05 | 1.05448E−05 | | | 1.87395E−03 | 9.82829E+00 | −1.04677E+02 |

| | Surface # | | | | | | |
|---|---|---|---|---|---|---|---|
| | 9 | 10 | 11 | 12 | 13 | 14 | 15 |
| k = | 1.10848E+01 | −5.24838E+00 | 2.33963E+00 | −3.91464E+01 | −4.47593E+01 | −7.59124E+00 | −5.00000E+01 |
| A4 = | −3.04606E−01 | −4.22504E−02 | −1.30036E−01 | −1.32843E−01 | −3.46151E−02 | −2.87453E−02 | −2.37772E−02 |
| A6 = | −2.14266E−02 | −1.84018E−02 | 3.63886E−02 | −3.07364E−02 | −9.94951E−04 | −2.81416E−04 | −2.96345E−04 |
| A8 = | 1.25362E−01 | −9.58642E−04 | −5.59093E−03 | 1.27513E−02 | 2.88027E−04 | 4.43962E−04 | 2.41184E−04 |
| A10 = | −1.36523E−01 | | | 2.43520E−03 | 2.58535E−04 | 8.40337E−06 | −2.56288E−05 |
| A12 = | | | | | | −6.44926E−06 | −1.99547E−06 |

In the optical image capturing lenses according to the seventh embodiment, the definitions of f, Fno, HFOV, FOV, CT1, CT2, f1, ff, fr, CRAmax, DIST, SAG11 and YD1 are the same as those stated in the first embodiment with corresponding values for the seventh embodiment. Rn1 and Rn2 are the curvature radius of the surfaces of the sixth lens element 760 which has negative refractive power and is nearest to the image plane 780. Moreover, these parameters can be calculated from Table 13 as the following values and satisfy the following relationships:

| 7th Embodiment | | | |
|---|---|---|---|
| f(mm) | 4.61 | f/f1 | 0.08 |
| Fno | 7.00 | fr/ff | 0.005 |
| HFOV(deg.) | 38.5 | CRAmax (deg.) | 11.2 |
| FOV (deg.) | 77.0 | DIST [%] | −34.9 |
| CT1/CT2 | 2.69 | SAG11/YD1 | 0.58 |
| (Rn1 − Rn2)/(Rn1 + Rn2) | 1.20 | | |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

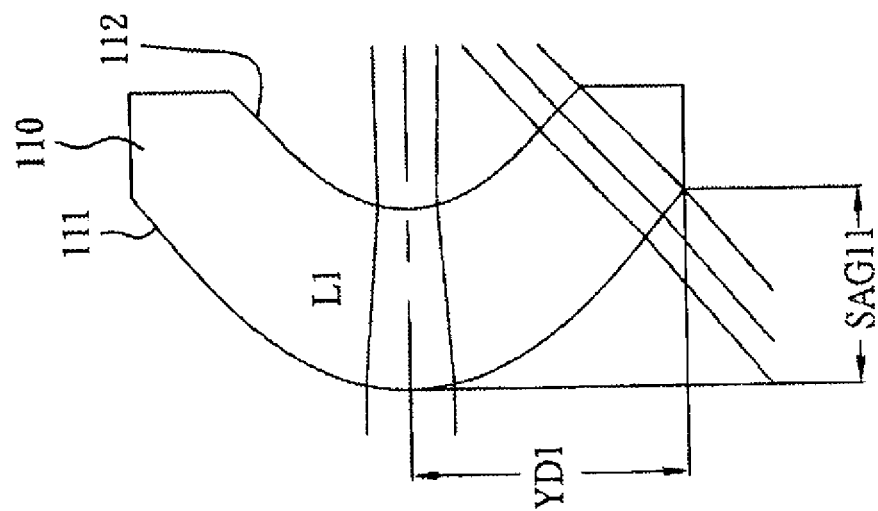

What is claimed is:

1. An optical image capturing lenses comprising, in order from an object side to an image side:
   a front lens group comprising, in order from an object side to an image side:
   a first lens element with refractive power having a convex object-side surface and a concave image-side surface; and
   a second lens element with refractive power;
   a stop; and
   a rear lens group comprising, in order from an object side to an image side:
   a third lens element with refractive power;
   a fourth lens element with refractive power;
   a fifth lens element with refractive power; and
   a sixth lens element with refractive power made of plastic, wherein an object-side surface and an image-side surface of the sixth lens element are aspheric, and the sixth lens element has at least one inflection point formed on at least one of the object-side surface and the image-side surface thereof;
   wherein a maximal field of view of the optical image capturing lenses is FOV, a maximal negative distortion of the optical image capturing lenses is DIST, and a maximal chief ray angle on an image plane of the optical image capturing lenses is CRAmax, the following relationships are satisfied:

55 degrees<FOV<90 degrees;

−70%<DIST<−25%; and

CRAmax<15 degrees.

2. The optical image capturing lenses of claim 1, wherein a focal length of the front lens group is ff, and a focal length of the rear lens group is fr, the following relationship is satisfied:

$-1.0 < fr/ff < 0.1$.

3. The optical image capturing lenses of claim 2, wherein the sixth lens element has a convex object-side surface and a concave image-side surface.

4. The optical image capturing lenses of claim 3, wherein the fourth lens element has positive refractive power, the fifth lens element has negative refractive power, and the sixth lens element has positive refractive power.

5. The optical image capturing lenses of claim 4, wherein there are seven lens elements of the optical image capturing lenses with refractive power, and the maximal negative distortion of the optical image capturing lenses is DIST, the following relationship is satisfied:

−70%<DIST<−30%.

6. The optical image capturing lenses of claim 4, wherein the fourth lens element has a convex object-side surface and a convex image-side surface, the fifth lens element has a convex object-side surface and a concave image-side surface, the object-side surface and the image-side surface of the fifth lens element are aspheric, and the fifth lens element is made of plastic material.

7. The optical image capturing lenses of claim 2, wherein the maximal chief ray angle on an image plane of the optical image capturing lenses is CRAmax, the following relationship is satisfied:

CRAmax<10 degrees.

8. The optical image capturing lenses of claim 7, wherein the focal length of the front lens group is ff, and the focal length of the rear lens group is fr, the following relationship is satisfied:

−0.5<fr/ff<−0.1.

9. The optical image capturing lenses of claim 1, wherein the maximum SAG of the effective aperture on the object-side surface of the first lens element is SAG11, and an effective radius of the object-side surface of the first lens element is YD1, the following relationship is satisfied:

0.3<SAG11/YD1<1.0.

10. The optical image capturing lenses of claim 9, wherein a focal length of the optical image capturing lenses is f, and a focal length of the first lens element is f1, the following relationship is satisfied:

−0.6<f/f1<0.3.

11. The optical image capturing lenses of claim 10, wherein at least three of the lens elements are made of plastic material, the fourth lens element has a convex object-side surface and a convex image-side surface, the fifth lens element has a convex object-side surface and a concave image-side surface, and the sixth lens element has a convex object-side surface and a concave image-side surface.

12. The optical image capturing lenses of claim 10, wherein the maximum SAG of the effective aperture on the object-side surface of the first lens element is SAG11, and an effective radius of the object-side surface of the first lens element is YD1, the following relationship is satisfied:

0.5<SAG11/YD1<0.8.

13. The optical image capturing lenses of claim 10, wherein a central thickness of the first lens element is CT1, and a central thickness of the second lens element is CT2, the following relationship is satisfied:

2.0<CT1/CT2<3.5.

14. The optical image capturing lenses of claim 9, wherein the maximal chief ray angle on an image plane of the optical image capturing lenses is CRAmax, the following relationship is satisfied:

CRAmax<10 degrees.

15. The optical image capturing lenses of claim 14, wherein a curvature radius of an object-side surface of the lens element nearest to the image plane with negative power is Rn1, a curvature radius of an image-side surface of the lens element nearest to the image plane with negative power is Rn2, the following relationship is satisfied:

0<(Rn1−Rn2)/(Rn1+Rn2)<1.5.

16. An optical image capturing lenses comprising, in order from an object side to an image side:
a front lens group, a stop; and a rear lens group, wherein the optical image capturing lenses comprising at least five lens elements, wherein at least one lens element of the five lens elements has at least one inflection point formed on at least one of an object-side surface and an image-side surface thereof, and is made of plastic material;
wherein a maximal field of view of the optical image capturing lenses is FOV, a maximal negative distortion of the optical image capturing lenses is DIST, a maximal chief ray angle on an image plane of the optical image capturing lenses is CRAmax, a focal length of the front lens group is ff, and a focal length of the rear lens group is fr, the following relationships are satisfied:

55 degrees<FOV<90 degrees;

−70%<DIST<−25%;

CRAmax<15 degrees; and

−0.5<fr/ff<−0.1.

17. The optical image capturing lenses of claim 16, wherein the three lens elements nearest to the image plane, in order from the object side to the image side, have positive, negative, and positive refractive power, wherein the lens element with negative refractive power has a convex object-side surface and a concave image-side surface with at least one inflection point formed on at least one of the object-side surface and the image-side surface thereof.

18. The optical image capturing lenses of claim 16, wherein the lens elements comprises, in order from an object side to an image side, a first lens element and a second lens element, wherein the first lens element has a convex object-side surface and a concave image-side surface, the second lens element has a convex object-side surface and a concave image-side surface, a central thickness of the first lens element is CT1, and a central thickness of the second lens element is CT2, the following relationship is satisfied:

2.0<CT1/CT2<3.5.

19. The optical image capturing lenses of claim 16, wherein the maximal chief ray angle on an image plane of the optical image capturing lenses is CRAmax, the following relationship is satisfied:

CRAmax<10 degrees.

20. An optical image capturing lenses comprising, in order from an object side to an image side:
a front lens group, a stop; and a rear lens group, wherein the optical image capturing lenses comprising at least five lens elements, wherein at least one lens element of the five lens elements is made of plastic material, and has at least one inflection point formed on at least one of an object-side surface and an image-side surface thereof, and the lens element nearest to an object is the first lens element, which has a convex object-side surface and a concave image-side surface;

wherein a maximal field of view of the optical image capturing lenses is FOV, a maximal negative distortion of the optical image capturing lenses is DIST, a maximal chief ray angle on an image plane of the optical image capturing lenses is CRAmax, the maximum SAG of the effective aperture on the object-side surface of the first lens element is SAG11, and an effective radius of the object-side surface of the first lens element is YD1, the following relationships are satisfied:

55 degrees<$FOV$<90 degrees;

−70%<DIST<−25%;

$CRA$max<15 degrees; and 0.3<$SAG11/YD1$<1.0.

21. The optical image capturing lenses of claim 20, wherein the lens element nearest to an image plane has positive refractive power and has at least one inflection point formed on at least one of an object-side surface and an image-side surface thereof, and has a convex object-side surface and a concave image-side surface.

22. The optical image capturing lenses of claim 20, wherein a curvature radius of an object-side surface of the lens element nearest to an image plane with negative refractive power is Rn1, a curvature radius of an image-side surface of the lens element nearest to an image plane with negative refractive power is Rn2, the following relationship is satisfied:

0<($Rn1−Rn2$)/($Rn1+Rn2$)<1.5.

23. The optical image capturing lenses of claim 21, wherein the optical image capturing lenses comprises, in order from an object side to an image side, the first lens element and a second lens element, wherein the second lens element has a convex object-side surface and a concave image-side surface, and a maximal field of view of the optical image capturing lenses is FOV, the following relationship is satisfied:

70 degrees<FOV<80 degrees.

24. An optical image capturing lenses comprising, in order from an object side to an image side:

a front lens group comprising, in order from an object side to an image side:
 a first lens element with refractive power having a convex object-side surface and a concave image-side surface;
 a second lens element with refractive power; and
 a third lens element with refractive power;
a stop; and
a rear lens group comprising, in order from an object side to an image side:
 a fourth lens element with refractive power;
 a fifth lens element with positive refractive power having a convex object-side surface and a convex image-side surface;
 a sixth lens element with negative refractive power having a convex object-side surface and a concave image-side surface, and made of plastic material, wherein the object-side surface and the image-side surface of the sixth lens element are aspheric; and
 a seventh lens element with positive refractive power having a convex object-side surface and a concave image-side surface, wherein the object-side surface and the image-side surface of the seventh lens element are aspheric, and the seventh lens element has at least one inflection point formed on at least one of the object-side surface and the image-side surface thereof, and made of plastic;
wherein a maximal field of view of the optical image capturing lenses is FOV, and a maximal negative distortion of the optical image capturing lenses is DIST, the following relationships are satisfied:

55 degrees<FOV<90 degrees; and

−70%<DIST<−25%.

25. The optical image capturing lenses of claim 24, wherein a maximal chief ray angle on an image plane of the optical image capturing lenses is CRAmax, the following relationship is satisfied:

CRAmax<15 degrees.

26. The optical image capturing lenses of claim 24, wherein a focal length of the optical image capturing lenses is f, and a focal length of the first lens element is f1, the following relationship is satisfied:

−0.6<$f/f1$<0.3.

* * * * *

UNITED STATES PATENT AND TRADEMARK OFFICE
CERTIFICATE OF CORRECTION

Page 1 of 2

PATENT NO. : 8,780,464 B2
APPLICATION NO. : 13/404001
DATED : July 15, 2014
INVENTOR(S) : Hsin-Hsuan Huang It is certified that error appears in the above-identified patent and that said Letters Patent is hereby corrected as shown below:

In the Drawings

Delete Drawing Sheet 15, and replace with new Drawing Sheet 15. (attached)

Signed and Sealed this
Twenty-eighth Day of October, 2014

Michelle K. Lee
*Deputy Director of the United States Patent and Trademark Office*